United States Patent
McArthur et al.

(10) Patent No.: US 11,119,478 B2
(45) Date of Patent: Sep. 14, 2021

(54) VEHICLE SENSOR VERIFICATION AND CALIBRATION

(71) Applicant: Waymo LLC, Mountain View, CA (US)

(72) Inventors: Stephanie McArthur, Mountain View, CA (US); Mark Alexander Shand, Palo Alto, CA (US); Colin Braley, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 193 days.

(21) Appl. No.: 16/035,576

(22) Filed: Jul. 13, 2018

(65) Prior Publication Data

US 2020/0019160 A1 Jan. 16, 2020

(51) Int. Cl.
| | | |
|---|---|---|
| *G05D 1/00* | (2006.01) | |
| *G01S 7/40* | (2006.01) | |
| *G01S 7/497* | (2006.01) | |
| *G05D 1/02* | (2020.01) | |
| *G01C 21/20* | (2006.01) | |
| *G01S 7/52* | (2006.01) | |

(52) U.S. Cl.
CPC ........... *G05D 1/0055* (2013.01); *G01C 21/20* (2013.01); *G01S 7/40* (2013.01); *G01S 7/497* (2013.01); *G01S 7/52004* (2013.01); *G05D 1/0255* (2013.01); *G05D 1/0257* (2013.01); *G05D 1/0259* (2013.01)

(58) Field of Classification Search
CPC .. G05D 1/0055; G05D 1/0255; G05D 1/0257; G05D 1/0259; G01C 21/20; G01S 7/40; G01S 7/497; G01S 7/52004

USPC ........................................................ 701/30.8
See application file for complete search history.

(56) References Cited

U.S. PATENT DOCUMENTS

| | | | |
|---|---|---|---|
| 8,918,302 B2 | 12/2014 | Hukkeri et al. | |
| 9,221,396 B1 * | 12/2015 | Zhu .................... | G06K 9/00791 |
| 9,430,822 B2 | 8/2016 | Irschara et al. | |
| 9,719,801 B1 * | 8/2017 | Ferguson ............... | G01C 25/00 |
| 9,952,317 B2 | 4/2018 | Valois et al. | |
| 2012/0173185 A1 | 7/2012 | Taylor et al. | |
| 2015/0254986 A1 | 9/2015 | Fairfield et al. | |
| 2015/0309165 A1 | 10/2015 | Elwart et al. | |
| 2017/0124781 A1 * | 5/2017 | Douillard ............. | G05D 1/0268 |

(Continued)

OTHER PUBLICATIONS

International Search Report & Written Opinion for International Application No. PCT/US2019/041723, dated Nov. 5, 2019.

*Primary Examiner* — Krishnan Ramesh
(74) *Attorney, Agent, or Firm* — McDonnell Boehnen Hulbert

(57) ABSTRACT

An example method involves detecting a sensor-testing trigger. Detecting the sensor-testing trigger may comprise determining that a vehicle is within a threshold distance to a target in an environment of the vehicle. The method also involves obtaining sensor data collected by a sensor of the vehicle after the detection of the sensor-testing trigger. The sensor data is indicative of a scan of a region of the environment that includes the target. The method also involves comparing the sensor data with previously-collected sensor data indicating detection of the target by one or more sensors during one or more previous scans of the environment. The method also involves generating performance metrics related to the sensor of the vehicle based on the comparison.

20 Claims, 9 Drawing Sheets

(56) References Cited

U.S. PATENT DOCUMENTS

| | | | |
|---|---|---|---|
| 2017/0343654 A1* | 11/2017 | Valois | G01S 17/08 |
| 2018/0045536 A1 | 2/2018 | Kummerle et al. | |
| 2018/0046864 A1* | 2/2018 | Flint | H04N 5/23206 |
| 2018/0081079 A1 | 3/2018 | Pyke et al. | |
| 2018/0139415 A1* | 5/2018 | Newman | H04N 7/181 |
| 2018/0180440 A1* | 6/2018 | Masuda | G01C 21/3461 |
| 2018/0196127 A1 | 7/2018 | Harada | |
| 2018/0356236 A1* | 12/2018 | Lawrenson | G01C 21/32 |
| 2019/0051063 A1* | 2/2019 | Tatourian | G07C 5/02 |
| 2019/0101410 A1* | 4/2019 | Kuper | H04W 4/38 |
| 2019/0121782 A1* | 4/2019 | Sun | G01D 21/02 |
| 2019/0196481 A1* | 6/2019 | Tay | G01S 17/86 |
| 2019/0204114 A1* | 7/2019 | Berntorp | B62D 15/021 |
| 2019/0204427 A1* | 7/2019 | Abari | G01S 17/86 |
| 2019/0258251 A1* | 8/2019 | Ditty | G05D 1/0088 |
| 2020/0018618 A1* | 1/2020 | Ozog | G01C 25/00 |
| 2020/0290638 A1* | 9/2020 | Damnjanovic | G08G 1/0112 |

* cited by examiner

VEHICLE SENSOR VERIFICATION AND CALIBRATION

BACKGROUND

A vehicle may be equipped with one or more sensors configured to detect information about an environment in which the vehicle operates. Passive sensors, such as cameras for instance, are sensors that scan a surrounding environment by passively receiving signals originating from an external source (e.g., the sun, etc.). Active sensors, such as light detection and ranging (LIDAR) sensors, radio detection and ranging (RADAR) sensors, sound navigation and ranging (SONAR) sensors, among others, are sensors that can scan a surrounding environment by emitting signals toward the surrounding environment and measuring reflections of the emitted signals.

SUMMARY

In one example, a method involves a vehicle detecting a sensor-testing trigger. Detecting the sensor-testing trigger may involve determining that the vehicle is within a threshold distance to a target in an environment of the vehicle. The method also involves obtaining sensor data collected by a sensor of the vehicle after the detection of the sensor-testing trigger. The sensor data may be indicative of a scan of a region of the environment that includes the target. The method also involves comparing the sensor data with previously-collected sensor data indicating detection of the target by one or more sensors during one or more previous scans of the environment. The method also involves generating performance metrics related to the sensor of the vehicle based on at least the comparison.

In another example, a system includes a first sensor that scans an environment of a vehicle, one or more processors, and data storage storing instructions that, when executed by the one or more processors, cause the system to perform operations. The operations comprise detecting a sensor-testing trigger. Detecting the sensor-testing trigger may comprise determining that the vehicle is within a threshold distance to a target in an environment of the vehicle. The operations further comprise obtaining sensor data collected using the first sensor after the detection of the sensor-testing trigger. The sensor data is indicative of a scan of a region of the environment that includes the target. The operations further comprise comparing the sensor data with previously-collected sensor data indicating detection of the target by one or more sensors during one or more previous scans of the environment. The operations further comprise generating performance metrics for the first sensor based on at least the comparison.

In yet another example, a non-transitory computer readable medium stores instructions that, when executed by one or more processors of a computing device, cause the computing device to perform operations. The operations comprise detecting a sensor-testing trigger. Detecting the sensor-testing trigger comprises determining that a vehicle is within a threshold distance to a target in an environment of the vehicle. The operations further comprise obtaining sensor data collected by a sensor of the vehicle after the detection of the sensor-testing trigger. The sensor data is indicative of a scan of a region of the environment that includes the target. The operations further comprise comparing the sensor data with previously-collected sensor data indicating detection of the target by one or more sensors during one or more previous scans of the environment. The operations further comprise generating performance metrics for the sensor of the vehicle based on at least the comparison.

In still another example, a system includes means for detecting a sensor-testing trigger. Detecting the sensor-testing trigger may involve determining that a vehicle is within a threshold distance to a target in an environment of the vehicle. The system also includes means for obtaining sensor data collected by a sensor of the vehicle after the detection of the sensor-testing trigger. The sensor data may be indicative of a scan of a region of the environment that includes the target. The system also includes means for comparing the sensor data with previously-collected sensor data indicating detection of the target by one or more sensors during one or more previous scans of the environment. The system also includes means for generating performance metrics related to the sensor of the vehicle based on at least the comparison.

These as well as other aspects, advantages, and alternatives, will become apparent to those of ordinary skill in the art by reading the following detailed description, with reference where appropriate to the accompanying figures.

DETAILED DESCRIPTION

Figure 1A:
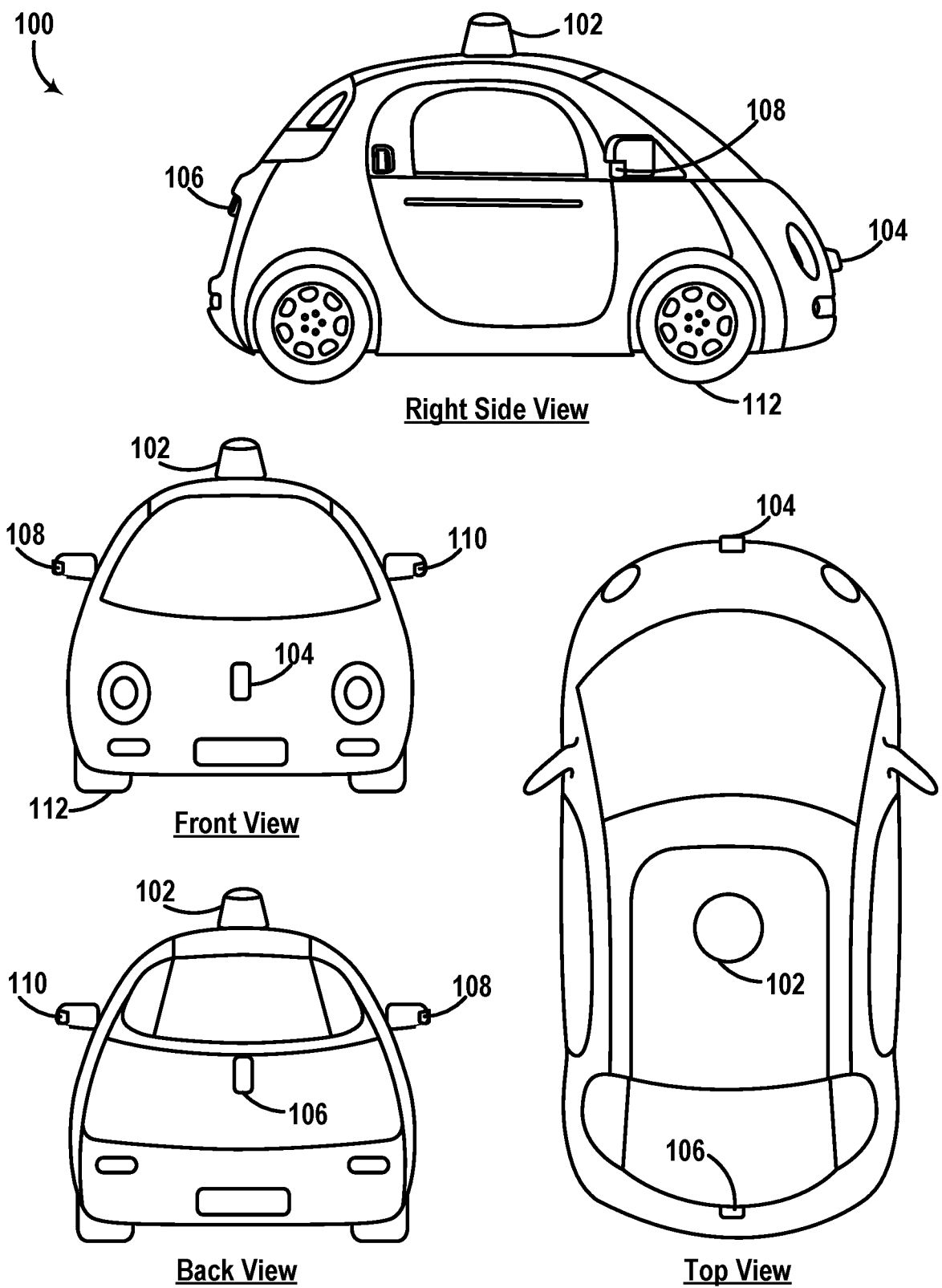
FIG. 1A illustrates a vehicle, according to an example embodiment.

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations.

I. OVERVIEW

Machines and machine subsystems, such as sensor systems of a vehicle for instance, may undergo testing and verification to maintain proper performance and adherence to specifications. However, conventional sensor verification processes can be highly manual and costly. For instance, a conventional sensor verification process may involve skilled technicians operating a sensor system to observe specially curated and placed calibration targets in a controlled calibration environment. As a result, conventional processes may be associated with high costs, such as costs for setup and maintenance of a suitable calibration environment for instance. For example, testing a scanning range of a long range sensor may present a challenge due to the physical space needed to test the entire scanning range of the sensor. Additionally, the amount of time involved in testing a large number of sensors repeatedly or periodically (e.g., daily, monthly, etc.) to maintain continued adherence with the specifications may result in substantial costs and delays.

Example systems and methods herein may involve sensor verification, validation, testing, and/or calibration using sensor data from a plurality of vehicles that operate in an environment. Each vehicle of the plurality may include one or more sensors (e.g., LIDARs, RADARs, cameras, etc.) configured to scan respective portions of the environment surrounding the vehicle. Additionally, in some scenarios, the vehicles may travel within or near a particular region of the environment periodically or intermittently. For instance, multiple vehicles may travel to a particular parking structure, street intersection, or other location on a regular (e.g., daily) basis.

Accordingly, one example system herein may be configured to identify a target (e.g., building, wall, feature, landmark, stationary object, etc.) that is repeatedly scanned by sensors mounted to a plurality of vehicles. The system may then cause vehicles that travel near the identified target to scan it using one or more respective sensors of the vehicles. The system may then compare a first scan of the target (by a first sensor) to one or more other scans of the target (e.g., scans by the first sensor at different times, scans by other sensor(s) in the same vehicle that includes the first sensor, scans by other sensor(s) of other vehicles, etc.). The system can then use the comparison as a basis for calibrating, aligning, repairing, testing, validating, and/or verifying the performance of the first sensor.

II. EXAMPLE SYSTEMS AND DEVICES

Example systems and devices will now be described in greater detail. In general, the embodiments disclosed herein can be used with any system that includes one or more sensors that scan an environment of the system. Illustrative embodiments described herein include vehicles that employ sensors, such as LIDARs, RADARs, SONARs, cameras, etc. However, an example system may also be implemented in or take the form of other devices, such as robotic devices, industrial systems (e.g., assembly lines, etc.), or mobile communication systems or devices, among other possibilities.

The term "vehicle" is broadly construed herein to cover any moving object, including, for instance, an aerial vehicle, watercraft, spacecraft, a car, a truck, a van, a semi-trailer truck, a motorcycle, a golf cart, an off-road vehicle, a warehouse transport vehicle, or a farm vehicle, as well as a carrier that rides on a track such as a roller coaster, trolley, tram, or train car, among other examples.

FIG. 1A illustrates a vehicle 100, according to an example embodiment. In particular, FIG. 1A shows a Right Side View, Front View, Back View, and Top View of the vehicle 100. Although vehicle 100 is illustrated in FIG. 1A as a car, as noted above, other embodiments are possible. Furthermore, in some embodiments, vehicle 100 may be configured to operate in an autonomous mode or a semi-autonomous mode. However, the embodiments described herein are also applicable to vehicles that are not configured to operate autonomously. Thus, the example vehicle 100 is not meant to be limiting. As shown, vehicle 100 includes five sensor units 102, 104, 106, 108, and 110, and four wheels, exemplified by wheel 112.

In some embodiments, each of the sensor units 102-110 may include one or more light detection and ranging devices (LIDARs) that have particular configuration properties to allow scanning an environment around the vehicle 100. Additionally or alternatively, in some embodiments, sensor units 102-110 may include different types of sensors, such as global positioning system sensors, inertial measurement units, radio detection and ranging (RADAR) units, cameras, laser rangefinders, LIDARs, and/or acoustic sensors among other possibilities.

As shown, sensor unit 102 is mounted to a top side of vehicle 100 opposite to a bottom side of vehicle 100 where the wheel 112 is mounted. Further, as shown, sensor units 104-110 are each mounted to a respective side of vehicle 100 other than the top side. For example, sensor unit 104 is positioned at a front side of vehicle 100, sensor 106 is positioned at a back side of vehicle 100, sensor unit 108 is positioned at a right side of vehicle 100, and the sensor unit 110 is positioned at a left side of vehicle 100.

While the sensor units 102-110 are shown to be mounted in particular locations on vehicle 100, in some embodiments, sensor units 102-110 may be mounted elsewhere, either inside or outside vehicle 100. For example, although FIG. 1A shows sensor unit 108 mounted to a rear-view mirror of vehicle 100, sensor unit 108 may alternatively be positioned in another location along the right side of vehicle 100. Further, while five sensor units are shown, in some embodiments more or fewer sensor units may be included in vehicle 100. However, for the sake of example, sensor units 102-110 are positioned as shown in FIG. 1A.

In some embodiments, one or more of sensor units 102-110 may include one or more movable mounts on which sensors may be movably mounted. The movable mount may include, for example, a rotating platform. Sensors mounted on the rotating platform could be rotated so that the sensors may obtain information from various directions around the vehicle 100. For example, sensor unit 102 may include a LIDAR having a viewing direction that can be adjusted by actuating the rotating platform to a different direction, etc. Alternatively or additionally, the movable mount may include a tilting platform. Sensors mounted on the tilting platform could be tilted within a given range of angles and/or azimuths so that the sensors may obtain information from a variety of angles. The movable mount may take other forms as well.

Further, in some embodiments, one or more of sensor units 102-110 may include an actuator configured to adjust the position and/or orientation of sensors in the sensor unit by moving the sensors and/or movable mounts. Example actuators include motors, pneumatic actuators, hydraulic pistons, relays, solenoids, piezoelectric actuators, among other examples.

As shown, vehicle 100 includes one or more wheels such as wheel 112 that are configured to rotate to cause the vehicle to travel along a driving surface. In some embodiments, wheel 112 may include at least one tire coupled to a rim. To that end, wheel 112 may include any combination of metal and rubber, or a combination of other materials. Vehicle 100 may include one or more other components in addition to or instead of those shown.

Figure 1B:
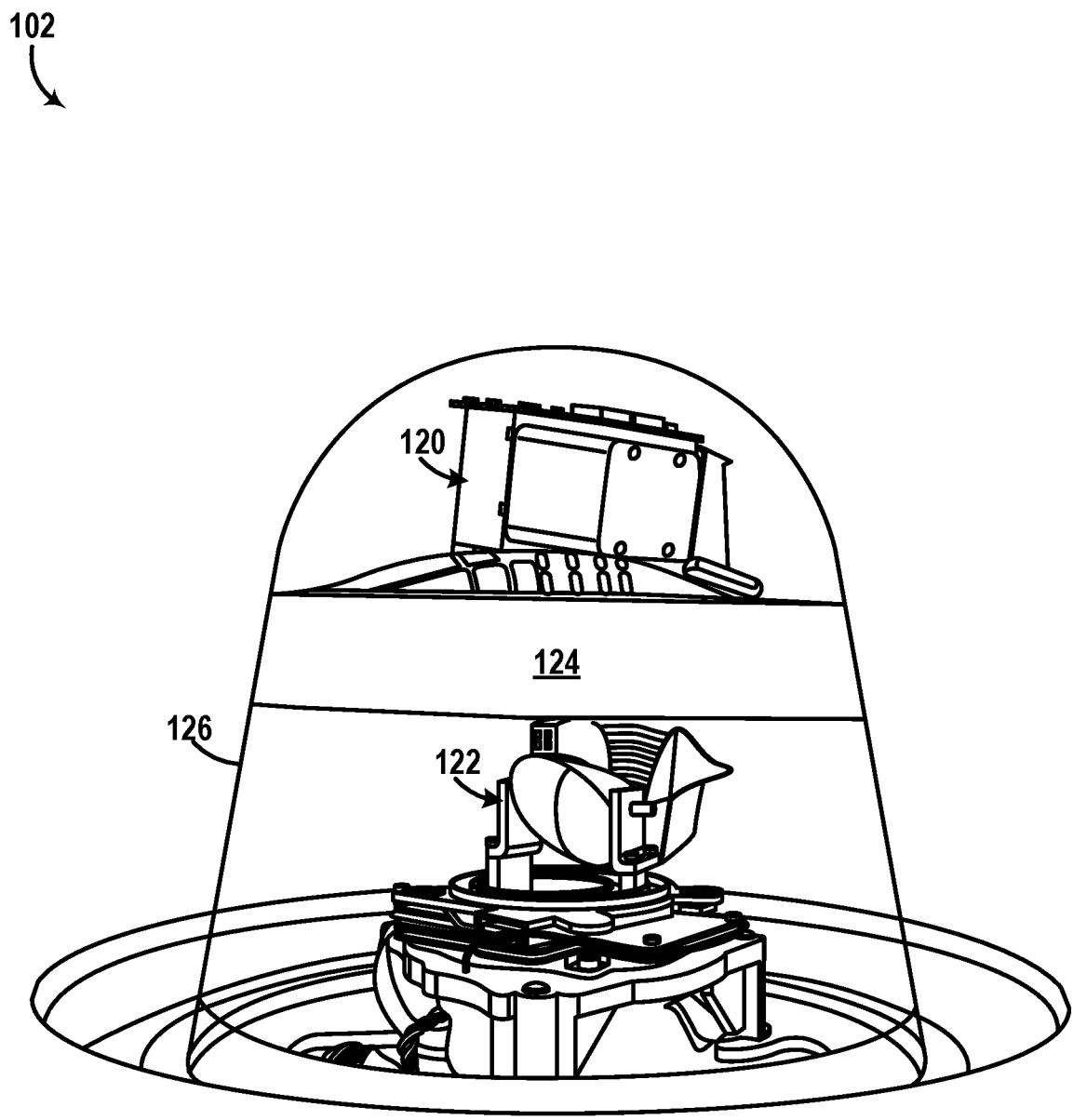
FIG. 1B is a perspective view of a sensor unit positioned at a top side of the vehicle shown in FIG. 1A, according to an example embodiment.

FIG. 1B is a perspective view of sensor unit 102 positioned at the top side of the vehicle 100 shown in FIG. 1A.

As shown, sensor unit 102 includes a first LIDAR 120, a second LIDAR 122, a dividing structure 124, and a light filter 126. As noted above, sensor unit 102 may additionally or alternatively include other sensors than those shown in FIG. 1B. However, for the sake of example, sensor unit 102 includes the components shown in FIG. 1B.

In some examples, the first LIDAR 120 may be configured to scan an environment around vehicle 100 by rotating about an axis (e.g., vertical axis, etc.) while emitting one or more light pulses and detecting reflections of the light pulses off objects in the environment of the vehicle. In some embodiments, the first LIDAR 120 may be configured to repeatedly rotate about the axis to be able to scan the environment at a sufficiently high refresh rate to quickly detect motion of objects in the environment. In one embodiment, the first LIDAR 120 may have a refresh rate of 10 Hz (e.g., ten complete rotations of the first LIDAR 120 per second), thereby scanning a 360-degree field-of-view (FOV) around the vehicle ten times every second. Through this process, for instance, a 3D map of the surrounding environment may be determined based on data from the first LIDAR 120. In one embodiment, the first LIDAR 120 may include a plurality of light sources that emit 64 laser beams having a wavelength of 905 nm. In this embodiment, the 3D map determined based on the data from the first LIDAR 120 may have a 0.2° (horizontal)×0.3° (vertical) angular resolution, and the first LIDAR 120 may have a 360° (horizontal)×20° (vertical) FOV of the environment. With this configuration, the 3D map may have sufficient resolution to detect or identify objects within a (medium) range of 100 meters from the vehicle 100, for example. However, other configurations (e.g., number of light sources, angular resolution, wavelength, range, etc.) are possible as well.

In some embodiments, the second LIDAR 122 may be configured to scan a narrower FOV of the environment around the vehicle 100. For instance, the second LIDAR 122 may be configured to rotate for less than a complete rotation about the same or similar (e.g., vertical) axis as the first LIDAR 120. Further, in some examples, the second LIDAR 122 may have a lower refresh rate than the first LIDAR 120. With this arrangement for instance, vehicle 100 may determine a 3D map of the narrower FOV of the environment using data from the second LIDAR 122. The 3D map in this case may have a higher angular resolution than the corresponding 3D map determined based on the data from first LIDAR 120, and may thus allow detection/identification of objects that are at a relatively greater distance to the vehicle, as well as identification of smaller objects within the scanning range of the first LIDAR 120. In one embodiment, the second LIDAR 122 may have a FOV of 8° (horizontal)×15° (vertical), a refresh rate of 4 Hz, and may emit a narrow beam having a wavelength of 1550 nm. Further, in this embodiment, the 3D map determined based on the data from the second LIDAR 122 may have an angular resolution of 0.1° (horizontal)×0.03° (vertical), thereby allowing detection/identification of objects within a (long) range of 300 meters from vehicle 100. However, other configurations (e.g., number of light sources, angular resolution, wavelength, range, etc.) are possible as well.

In some examples, vehicle 100 may be configured to adjust a viewing direction of second LIDAR 122. For example, the second LIDAR 122 may be mounted to a stepper motor (not shown) that allows adjusting the viewing direction of the second LIDAR 122 to directions other than the direction shown in FIG. 1B. Thus, in some examples, second LIDAR 122 may be steerable to scan a (narrow) FOV along various viewing directions from the vehicle 100.

Dividing structure 124 may be formed from any solid material suitable for supporting the first LIDAR 120 and/or optically isolating the first LIDAR 120 from the second LIDAR 122. Example materials may include metals, plastics, foam, among other possibilities.

Light filter 126 may be formed from any material that is substantially transparent to light having wavelengths within a wavelength range, and substantially opaque to light having wavelengths outside the wavelength range. For example, light filter 126 may allow light having a first wavelength of light emitted by the first LIDAR 120 (e.g., 905 nm) and a second wavelength of light emitted by the second LIDAR 122 (e.g., 1550 nm) to propagate through light filter 126. As shown, the light filter 126 is shaped to enclose the first LIDAR 120 and the second LIDAR 122. Further, in some examples, light filter 126 may prevent environmental damage to first LIDAR 120 and second LIDAR 122, such as accumulation of dust or collision with airborne debris among other possibilities. In some examples, light filter 126 may be configured to reduce visible light propagating through the light filter 126. In turn, light filter 126 may improve an aesthetic appearance of vehicle 100 by enclosing first LIDAR 120 and second LIDAR 122, while reducing visibility of components of sensor unit 102 from view of an outside observer, for example. In other examples, light filter 126 may be configured to allow visible light as well as the light from the first LIDAR 120 and the second LIDAR 122.

In some embodiments, portions of light filter 126 may be configured to allow different wavelength ranges to propagate through the light filter 126. For example, an upper portion of the light filter 126 (e.g., above dividing structure 124) may be configured to allow propagation of light within a first wavelength range that includes the first wavelength of the first LIDAR 120, and a lower portion of light filter 126 (e.g., below dividing structure 124) may be configured to allow propagation of light within a second wavelength range that includes the second wavelength of the second LIDAR 122. In other embodiments, the wavelength range associated with light filter 126 may include both the first wavelength of the first LIDAR 120 and the second wavelength of the second LIDAR 122.

Figure 1C:
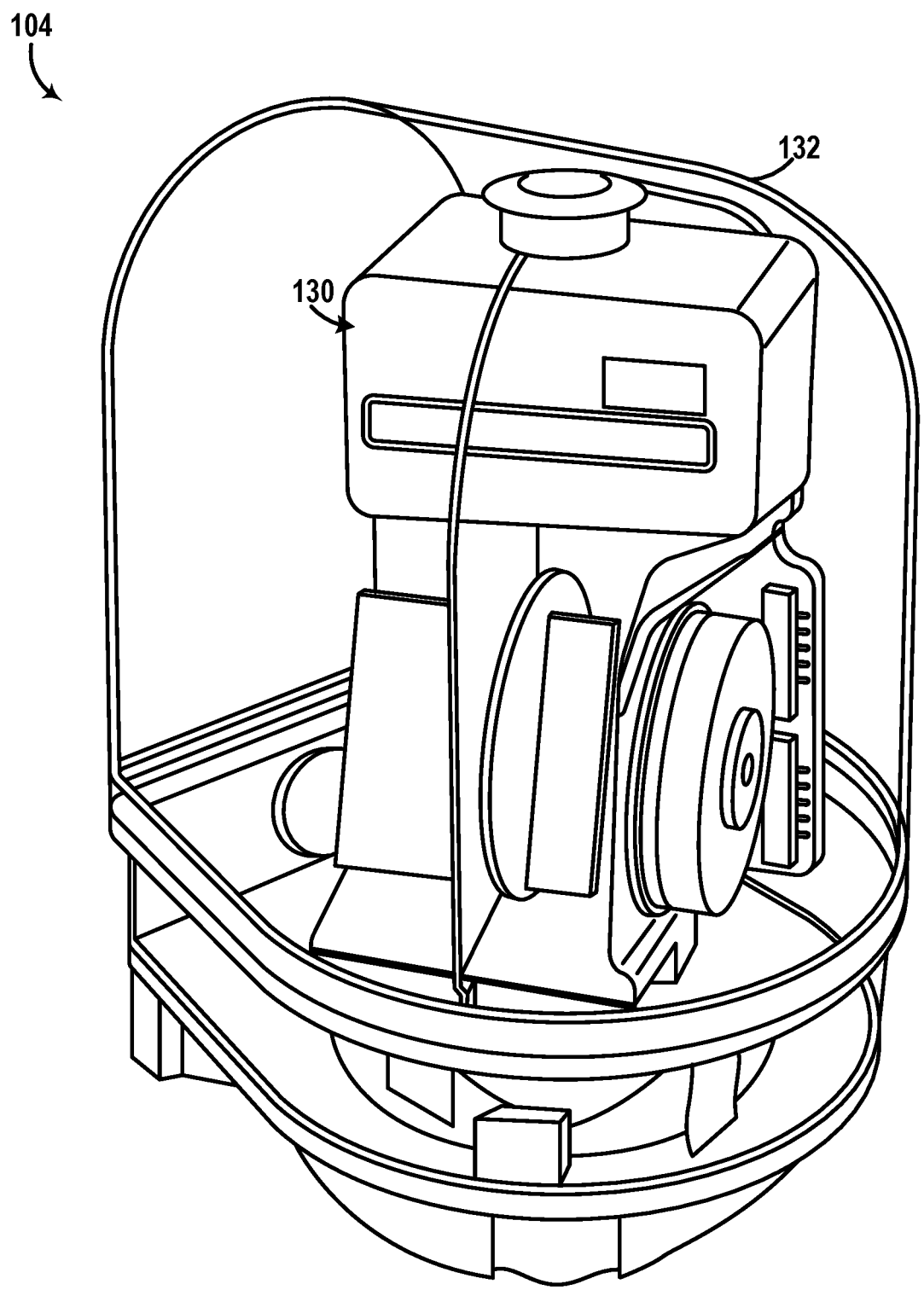
FIG. 1C is a perspective view of a sensor unit positioned at a front side of the vehicle shown in FIG. 1A, according to an example embodiment.

FIG. 1C is a perspective view of the sensor unit 104 positioned at the front side of the vehicle 100 shown in FIG. 1A. In some examples, sensor units 106, 108, and 110 may be configured similarly to sensor unit 104 illustrated in FIG. 1C. As shown, sensor unit 104 includes a third LIDAR 130 and a light filter 132. As noted above, sensor unit 104 may additionally or alternatively include other sensors than those shown in FIG. 1C. However, for the sake of example, sensor unit 104 includes the components shown in FIG. 1C.

In some examples, third LIDAR 130 may be configured to scan a FOV of the environment around the vehicle 100 that extends away from a given side of the vehicle 100 (i.e., the front side) where the third LIDAR 130 is positioned. In one example, third LIDAR 130 may be configured to rotate (e.g., horizontally) across a wider FOV than second LIDAR 122 but less than the 360-degree FOV of first LIDAR 120. In one embodiment, third LIDAR 130 may have a FOV of 270° (horizontal)×110° (vertical), a refresh rate of 4 Hz, and may emit a laser beam having a wavelength of 905 nm. In this embodiment, the 3D map determined based on the data from the third LIDAR 130 may have an angular resolution of 1.2° (horizontal)×0.2° (vertical), thereby allowing detection/identification of objects within a (short) range of 30 meters to the vehicle 100. However, other configurations (e.g., number of light sources, angular resolution, wavelength, range, etc.) are possible as well.

Light filter 132 may be similar to light filter 126 of FIG. 1B. For example, light filter 132 may be shaped to enclose the third LIDAR 130. Further, for example, light filter 132 may be configured to allow light within a wavelength range that includes the wavelength of light emitted by the third LIDAR 130 to propagate through light filter 132.

As noted above, sensor units 102-110 of vehicle 100 may alternatively or additionally include different types of sensors (e.g., RADARs, cameras, etc.) and may be mounted in different positions inside or outside vehicle 100.

Figure 1D:
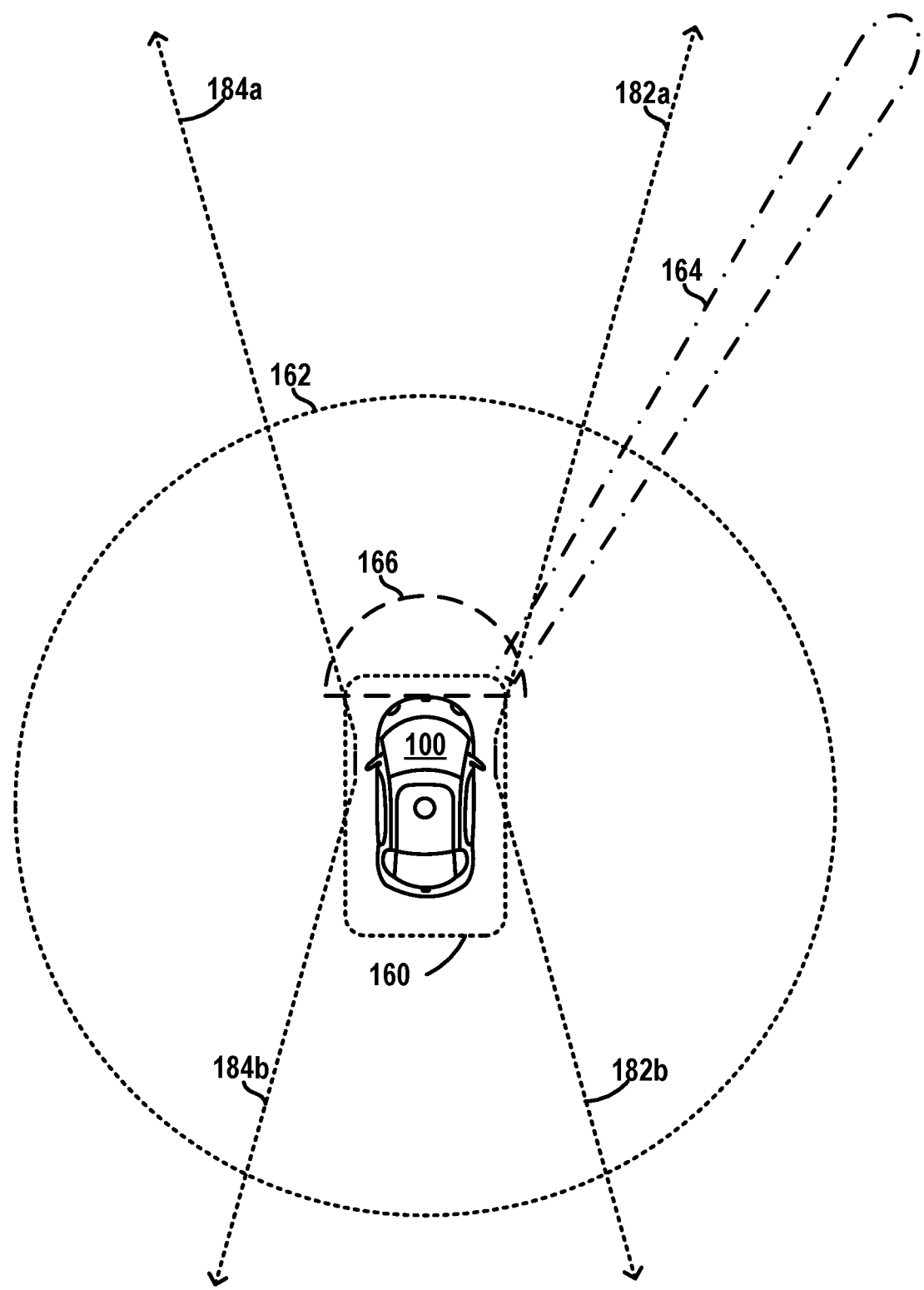
FIG. 1D illustrates in a top view the vehicle shown in FIG. 1A scanning a surrounding environment, according to an example embodiment.

FIG. 1D illustrates a top view of vehicle 100 in a scenario where vehicle 100 is scanning a surrounding environment. In line with the discussion above, each of the various sensors of vehicle 100 may have a particular resolution according to its respective refresh rate, FOV, or any other factor. In turn, the various sensors may be suitable for detection and/or identification of objects within a respective scanning range of distances from vehicle 100.

As shown in FIG. 1D, contours 160 and 162 illustrate an example range of distances to the vehicle 100 where objects may be detected/identified based on data from the first LIDAR 120 of sensor unit 102. As illustrated, for example, close objects within contour 160 may not be properly detected and/or identified due to the positioning of sensor unit 102 on the top side of vehicle 100. However, for example, objects outside of contour 160 and within a medium range of distances (e.g., 100 meters, etc.) defined by the contour 162 may be properly detected/identified using the data from the first LIDAR 120. Further, as shown, the horizontal FOV of the first LIDAR 120 may span 360° in all directions around the vehicle 100.

In the scenario shown, contour 164 may illustrate a region of the environment where objects may be detected and/or identified using the higher resolution data from the second LIDAR 122 of sensor unit 102. As shown, contour 164 may encompass objects further away from vehicle 100 than contour 162, within a longer range of distances (e.g., 300 meters, etc.), for example. Although contour 164 indicates a narrower FOV (horizontally) of second LIDAR 122, in some examples, vehicle 100 may be configured to adjust the viewing direction of second LIDAR 122 to any other direction than that shown in FIG. 1D. For instance, vehicle 100 may detect an object using the data from the first LIDAR 120 (e.g., within the contour 162), adjust the viewing direction of the second LIDAR 122 to a FOV that includes the object, and then identify the object using the higher resolution data from the second LIDAR 122. In one embodiment, the horizontal FOV of the second LIDAR 122 may be 8°.

Further, as shown in FIG. 1D, contour 166 may illustrate a region of the environment scanned by the third LIDAR 130 of sensor unit 104. As shown, the region illustrated by contour 166 includes portions of the environment that may not be scanned by the first LIDAR 120 and/or the second LIDAR 122, for example. Further, for example, data from the third LIDAR 130 may have a resolution sufficient to detect and/or identify objects within a short distance (e.g., 30 meters, etc.) to vehicle 100.

It is noted that the scanning ranges, resolutions, and FOVs described above are for exemplary purposes only, and may vary according to various configurations of vehicle 100. Further, the contours 160-166 shown in FIG. 1D are not necessarily to scale but are illustrated as shown for convenience of description.

Additionally, as noted above, vehicle 100 may include multiple types of sensors such as LIDARs, RADARs, sonars, ultrasound sensors, and/or cameras, among others. Further, for example, various sensors may be suitable for detection and/or identification of objects within respective FOVs of the respective sensors.

To that end, arrows 182a and 182b may illustrate a region of the environment defined by a FOV of a sensor mounted along a side of the vehicle 100, such as a sensor in the sensor unit 108 of FIG. 1A or any other sensor. For example, the sensor associated with the arrows 182a and 182b may be a RADAR sensor that is configured to scan a portion of the environment that extends away from vehicle 100 between arrows 182a and 182b. Additionally or alternatively, in some examples, the sensor associated with the arrows 182a and 182b may include any other type of sensor (e.g., SONAR, camera, etc.). However, for the sake of example, arrows 182a and 182b are described herein as the extents of a FOV of a RADAR sensor. In this example, the RADAR sensor may be configured to detect objects (within the region of the environment between arrows 182a and 182b) that have at least a threshold RADAR cross-section. In one embodiment, the threshold RADAR cross-section may relate to dimensions of a motorcycle, scooter, car, and/or any other vehicle (e.g., 0.5 square meters, etc.). Other example threshold RADAR cross-section values are possible as well.

Similarly, arrows 184a and 184b may illustrate a region of the environment that is within a FOV of another sensor (e.g., another RADAR) mounted along an opposite side of vehicle 100, such as a sensor in the sensor unit 110 of FIG. 1A, for example.

It is noted that the angles between the arrows 182a, 182b and/or 184a, 184b shown in FIG. 1D are not to scale and are for illustrative purposes only. Thus, in some examples, the horizontal FOVs of the sensors in sensor units 108 and 110 may vary as well.

Figure 2:
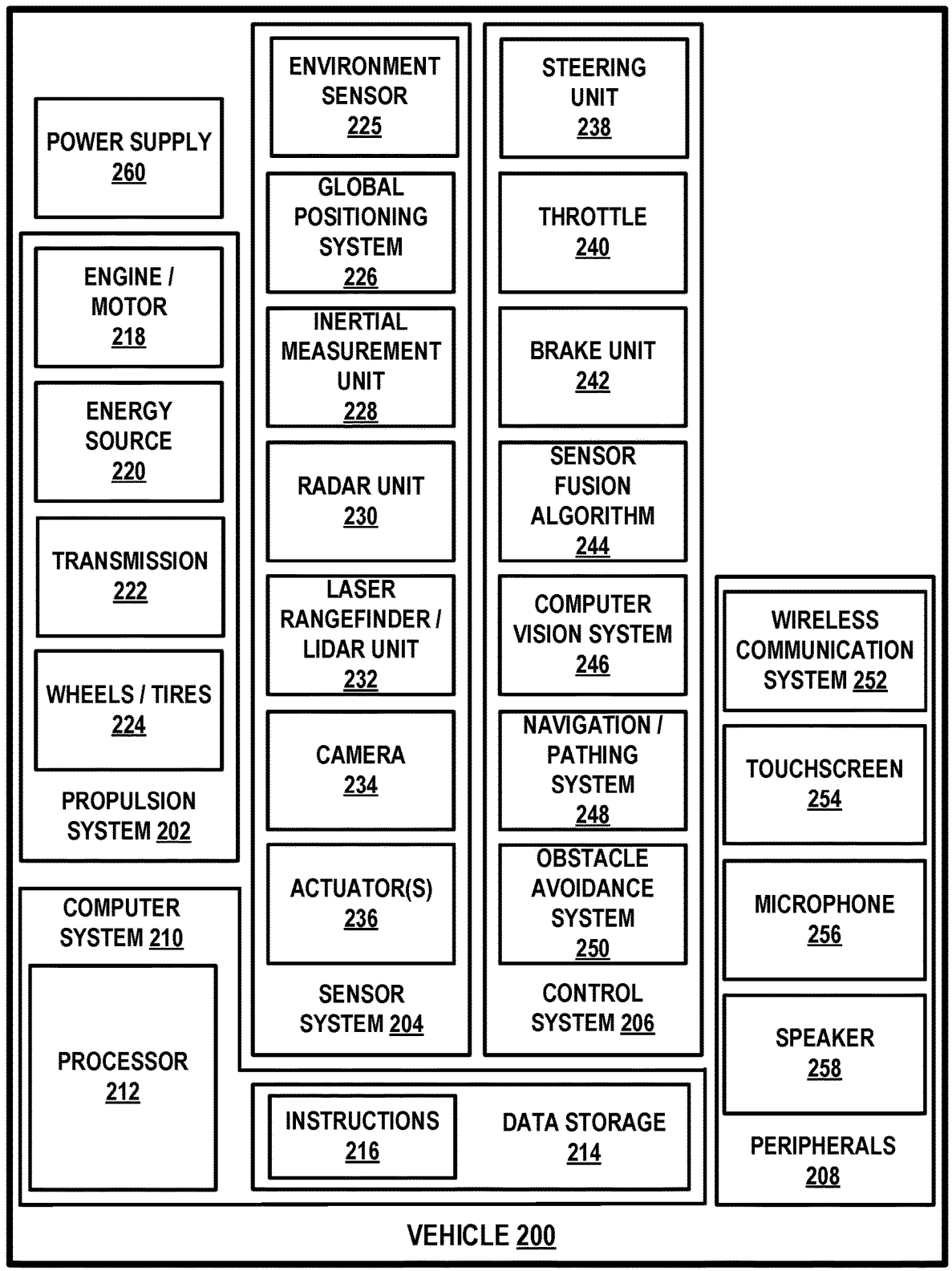
FIG. 2 is a block diagram of a vehicle, according to an example embodiment.

FIG. 2 is a simplified block diagram of a vehicle 200, according to an example embodiment. Vehicle 200 may be similar to vehicle 100, for example. As shown, vehicle 200 includes a propulsion system 202, a sensor system 204, a control system 206, peripherals 208, and a computer system 210. In other embodiments, vehicle 200 may include more, fewer, or different systems, and each system may include more, fewer, or different components. Further, the systems and components shown may be combined or divided in any number of ways.

The propulsion system 202 may be configured to provide powered motion for the vehicle 200. As shown, propulsion system 202 includes an engine/motor 218, an energy source 220, a transmission 222, and wheels/tires 224.

The engine/motor 218 may be or include an internal combustion engine, an electric motor, a steam engine, or a Stirling engine, among other possible types of motors and/or engines. Other motors and engines are possible as well. In some embodiments, the propulsion system 202 may include multiple types of engines and/or motors. For instance, a gas-electric hybrid car may include a gasoline engine and an electric motor. Other examples are possible.

The energy source 220 may be a source of energy that powers the engine/motor 218 in full or in part. That is, the engine/motor 218 may be configured to convert the energy source 220 into mechanical energy. Examples of energy sources 220 include gasoline, diesel, propane, other compressed gas-based fuels, ethanol, solar panels, batteries, and other sources of electrical power. The energy source(s) 220 may additionally or alternatively include any combination of fuel tanks, batteries, capacitors, and/or flywheels. In some embodiments, the energy source 220 may provide energy for other systems of the vehicle 200 as well.

The transmission 222 may be configured to transmit mechanical power from the engine/motor 218 to the wheels/tires 224. To this end, the transmission 222 may include a gearbox, clutch, differential, drive shafts, and/or other elements. In embodiments where the transmission 222 includes drive shafts, the drive shafts may include one or more axles that are configured to be coupled to the wheels/tires 224.

The wheels/tires 224 of vehicle 200 may be configured in various formats, including a unicycle, bicycle/motorcycle, tricycle, or car/truck four-wheel format. Other wheel/tire formats are possible as well, such as those including six or more wheels. In any case, the wheels/tires 224 may be configured to rotate differentially with respect to other wheels/tires 224. In some embodiments, the wheels/tires 224 may include at least one wheel that is fixedly attached to the transmission 222 and at least one tire coupled to a rim of the wheel that could make contact with the driving surface. The wheels/tires 224 may include any combination of metal and rubber, or combination of other materials. The propulsion system 202 may additionally or alternatively include components other than those shown.

The sensor system 204 may include a number of sensors configured to sense information about an environment in which the vehicle 200 is located, as well as one or more actuators 236 configured to modify a position and/or orientation of the sensors. As shown, the sensors of the sensor system 204 include an Environment Sensor 225, Global Positioning System (GPS) 226, an inertial measurement unit (IMU) 228, a RADAR unit 230, a laser rangefinder and/or LIDAR unit 232, and a camera 234. The sensor system 204 may include additional sensors as well, including, for example, sensors that monitor internal systems of the vehicle 200 (e.g., an $O_2$ monitor, a fuel gauge, an engine oil temperature, etc.), range sensors (e.g., sonars, ultrasonic sensors, etc.), among other possibilities. Further, the sensor system 204 may include multiple LIDARs. In some examples, the sensor system 204 may be implemented as multiple sensor units each mounted to the vehicle in a respective position (e.g., top side, bottom side, front side, back side, right side, left side, etc.). Other sensors are possible as well.

The environment sensor 225 may include any type of sensor (e.g. temperature sensor, humidity sensor, etc.) that measures a condition of an environment of vehicle 200. For example, environment sensor 225 may include a temperature sensor, such as a thermocouple, thermistor, thermostat, resistive temperature detector, or any other type of temperature sensor configured to provide a measurement of a temperature of an environment of the vehicle 200.

The GPS 226 may be any sensor (e.g., location sensor) configured to estimate a geographic location of the vehicle 200. To this end, the GPS 226 may include a transceiver configured to estimate a position of the vehicle 200 with respect to the Earth. The GPS 226 may take other forms as well.

The IMU 228 may be any combination of sensors configured to sense position and orientation changes of the vehicle 200 based on inertial acceleration. In some embodiments, the combination of sensors may include, for example, accelerometers and gyroscopes. Other combinations of sensors are possible as well.

The RADAR unit 230 may be any sensor configured to sense objects in the environment in which the vehicle 200 is located using radio signals. In some embodiments, in addition to sensing the objects, the RADAR unit 230 may additionally be configured to sense the speed and/or heading of the objects.

Similarly, the laser range finder or LIDAR unit 232 may be any sensor configured to sense objects in the environment in which the vehicle 200 is located using lasers. In particular, the laser rangefinder or LIDAR unit 232 may include a laser source and/or laser scanner configured to emit a laser and a detector configured to detect reflections of the laser. The laser rangefinder or LIDAR 232 may be configured to operate in a coherent (e.g., using heterodyne detection) or an incoherent detection mode. In some examples, the LIDAR unit 232 may include multiple LIDARs that each have a unique position and/or configuration suitable for scanning a particular region of an environment around the vehicle 200.

The camera 234 may be any camera (e.g., a still camera, a video camera, etc.) configured to capture images of the environment in which the vehicle 200 is located. To this end, the camera may take any of the forms described above. The sensor system 204 may additionally or alternatively include components other than those shown.

The control system 206 may be configured to control operation of the vehicle 200 and its components. To this end, the control system 206 may include a steering unit 238, a throttle 240, a brake unit 242, a sensor fusion algorithm 244, a computer vision system 246, a navigation or pathing system 248, and an obstacle avoidance system 250.

The steering unit 238 may be any combination of mechanisms configured to adjust the heading of vehicle 200. The throttle 240 may be any combination of mechanisms configured to control the operating speed of the engine/motor 218 and, in turn, the speed of the vehicle 200. The brake unit 242 may be any combination of mechanisms configured to decelerate the vehicle 200. For example, the brake unit 242 may use friction to slow the wheels/tires 224. As another example, the brake unit 242 may convert the kinetic energy of the wheels/tires 224 to electric current. The brake unit 242 may take other forms as well.

The sensor fusion algorithm 244 may be an algorithm (or a computer program product storing an algorithm) configured to accept data from the sensor system 204 as an input. The data may include, for example, data representing information sensed at the sensors of the sensor system 204. The sensor fusion algorithm 244 may include, for example, a Kalman filter, a Bayesian network, an algorithm for some of the functions of the methods herein, or any another algorithm. The sensor fusion algorithm 244 may further be configured to provide various assessments based on the data from the sensor system 204, including, for example, evaluations of individual objects and/or features in the environment in which the vehicle 100 is located, evaluations of particular situations, and/or evaluations of possible impacts based on particular situations. Other assessments are possible as well.

The computer vision system 246 may be any system configured to process and analyze images captured by the camera 234 in order to identify objects and/or features in the environment in which the vehicle 200 is located, including, for example, traffic signals and obstacles. To this end, the computer vision system 246 may use an object recognition algorithm, a Structure from Motion (SFM) algorithm, video tracking, or other computer vision techniques. In some embodiments, the computer vision system 246 may additionally be configured to map the environment, track objects, estimate the speed of objects, etc.

The navigation and pathing system 248 may be any system configured to determine a driving path for the vehicle 200. The navigation and pathing system 248 may additionally be configured to update the driving path dynamically while the vehicle 200 is in operation. In some embodiments, the navigation and pathing system 248 may be configured to incorporate data from the sensor fusion algorithm 244, the GPS 226, the LIDAR unit 232, and one or more predetermined maps so as to determine the driving path for vehicle 200.

The obstacle avoidance system 250 may be any system configured to identify, evaluate, and avoid or otherwise negotiate obstacles in the environment in which the vehicle 200 is located. The control system 206 may additionally or alternatively include components other than those shown.

Peripherals 208 may be configured to allow the vehicle 200 to interact with external sensors, other vehicles, external computing devices, and/or a user. To this end, the peripherals 208 may include, for example, a wireless communication system 252, a touchscreen 254, a microphone 256, and/or a speaker 258.

The wireless communication system 252 may be any system configured to wirelessly couple to one or more other vehicles, sensors, or other entities, either directly or via a communication network. To this end, the wireless communication system 252 may include an antenna and a chipset for communicating with the other vehicles, sensors, servers, or other entities either directly or via a communication network. The chipset or wireless communication system 252 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 252 may take other forms as well.

The touchscreen 254 may be used by a user to input commands to the vehicle 200. To this end, the touchscreen 254 may be configured to sense at least one of a position and a movement of a user's finger via capacitive sensing, resistance sensing, or a surface acoustic wave process, among other possibilities. The touchscreen 254 may be capable of sensing finger movement in a direction parallel or planar to the touchscreen surface, in a direction normal to the touchscreen surface, or both, and may also be capable of sensing a level of pressure applied to the touchscreen surface. The touchscreen 254 may be formed of one or more translucent or transparent insulating layers and one or more translucent or transparent conducting layers. The touchscreen 254 may take other forms as well.

The microphone 256 may be configured to receive audio (e.g., a voice command or other audio input) from a user of the vehicle 200. Similarly, the speakers 258 may be configured to output audio to the user of the vehicle 200. The peripherals 208 may additionally or alternatively include components other than those shown.

The computer system 210 may be configured to transmit data to, receive data from, interact with, and/or control one or more of the propulsion system 202, the sensor system 204, the control system 206, and the peripherals 208. To this end, the computer system 210 may be communicatively linked to one or more of the propulsion system 202, the sensor system 204, the control system 206, and the peripherals 208 by a system bus, network, and/or other connection mechanism (not shown).

In one example, the computer system 210 may be configured to control operation of the transmission 222 to improve fuel efficiency. As another example, the computer system 210 may be configured to cause the camera 234 to capture images of the environment. As yet another example, the computer system 210 may be configured to store and execute instructions corresponding to the sensor fusion algorithm 244. As still another example, the computer system 210 may be configured to store and execute instructions for determining a 3D representation of the environment around the vehicle 200 using the LIDAR unit 232. Other examples are possible.

As shown, the computer system 210 includes the processor 212 and data storage 214. The processor 212 may comprise one or more general-purpose processors and/or one or more special-purpose processors. To the extent the processor 212 includes more than one processor, such processors could work separately or in combination. Data storage 214, in turn, may comprise one or more volatile and/or one or more non-volatile storage components, such as optical, magnetic, and/or organic storage, and data storage 214 may be integrated in whole or in part with the processor 212.

In some embodiments, data storage 214 may contain instructions 216 (e.g., program logic) executable by the processor 212 to execute various vehicle functions (e.g., method 400 illustrated in FIG. 4 and described below). Data storage 214 may contain additional instructions as well, including instructions to transmit data to, receive data from, interact with, and/or control one or more of the propulsion system 202, the sensor system 204, the control system 206, and/or the peripherals 208. The computer system 210 may additionally or alternatively include components other than those shown.

As shown, the vehicle 200 further includes a power supply 260, which may be configured to provide power to some or all of the components of the vehicle 200. To this end, the power supply 260 may include, for example, a rechargeable lithium-ion or lead-acid battery. In some embodiments, one or more banks of batteries could be configured to provide electrical power. Other power supply materials and configurations are possible as well. In some embodiments, the power supply 260 and energy source 220 may be implemented together as one component, as in some all-electric cars.

In some embodiments, the vehicle 200 may include one or more elements in addition to or instead of those shown. For example, the vehicle 200 may include one or more additional interfaces and/or power supplies. Other additional components are possible as well. In such embodiments, data storage 214 may further include instructions executable by the processor 212 to control and/or communicate with the additional components.

Still further, while FIG. 2 shows the components and systems as integrated in the vehicle 200, in some embodiments, one or more components or systems may be removably mounted on or otherwise connected (mechanically or electrically) to the vehicle 200 using wired or wireless connections. In one example, a portion of the computing system 210 that determines operation instructions for one or more of the sensors in the sensor system 204 may be disposed outside the vehicle 200 (e.g., in a remote server, etc.) that is in communication with the vehicle 200 via a wireless communication interface (e.g., wireless communication system 252, etc.). The vehicle 200 may take other forms as well.

Figure 3:
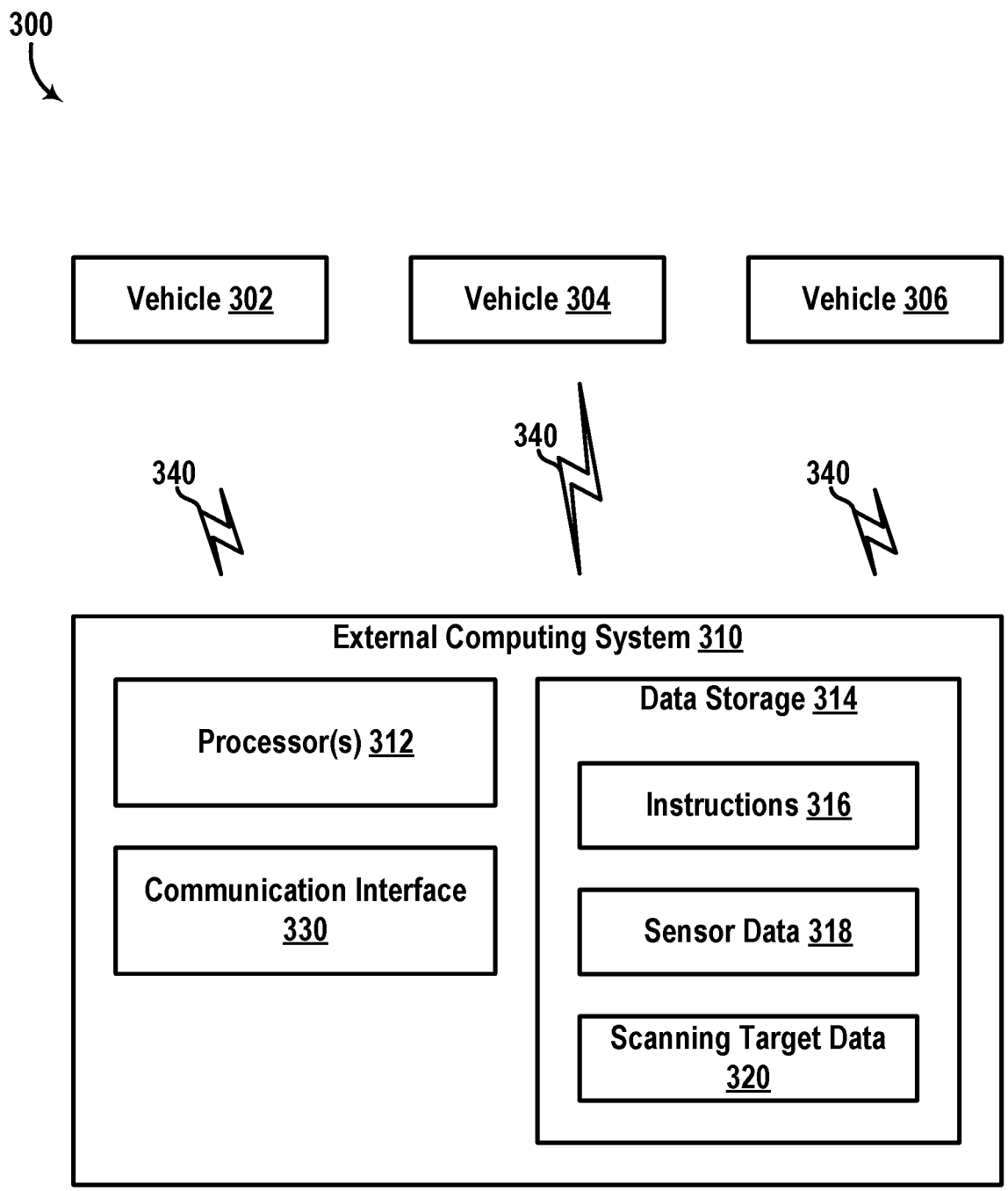
FIG. 3 is a block diagram of a system for testing vehicle-mounted sensors, according to an example embodiment.

FIG. 3 is a simplified block diagram of a system 300 for testing vehicle-mounted sensors, according to an example embodiment. As shown, system 300 includes vehicles 302, 304, 306, and an external computing system 310.

Vehicles 302, 304, 306 may be similar to vehicles 100 and/or 200. For instance, vehicles 302, 304, 306 may each include one or more sensors (e.g., LIDAR, RADAR, camera, SONAR, etc.) that scan an environment of vehicles 302, 304, 306. It is noted that system 300 is shown to include three vehicles 302, 304, 306 by way of example. In other embodiments, system 300 may include a greater or fewer number of vehicles.

External computing system 310 may include one or more systems (e.g., remote servers, etc.) configured to communicate with vehicles 302, 304, 306 via wireless signals 340. As shown, system 310 includes one or more processors 312, data storage 314, and a communication interface 330. Further, as shown, data storage 314 includes program instructions 316, sensor data 318, and scanning target data 320.

Processor(s) 312, data storage 314, instructions 316, and communication interface 330 may be similar, respectively, to processor(s) 212, data storage 214, instructions 316, and communication system 352 of vehicle 200. For example, processor(s) 312 may comprise one or more general-purpose or special-purpose controllers that operate various components of system 310 in accordance with the present disclosure. In some implementations, processor(s) 312 may be configured to execute instructions 316 to cause system 310 to perform one or more of the functions described herein. For example, instructions 316, when executed by processor(s) 312, may cause system 310 to operate communication interface 330 to establish a wireless connection (via signals 340) with any of vehicles 302, 304, 306. In turn, for instance, a vehicle may transmit, to system 310, sensor data collected by sensors mounted thereon via wireless signals 340. The vehicle may also receive operation instructions from system 310 via signals 340, such as instructions that indicate a location of a calibration target in the environment of the vehicle, instructions for collecting (and/or transmitting to system 310) sensor data associated with a scan of the calibration target, among other examples. Additionally or alternatively, in some implementations, processor(s) 312 (and/or data storage 314) may include analog and/or digital circuitry wired to perform one or more of the functions described herein.

Sensor data 318 may include sensor data collected by vehicles 302, 304, 306 and stored in data storage 314. By way of example, sensor data 318 may indicate multiple scans of one or more targets (e.g., stationary object, building, landmark, geographic feature, etc.) in the environment by sensors mounted to vehicles 302, 304, and 306. In one example, sensor data 318 may include sensor data collected by a particular sensor of a vehicle based on multiple scans of the same target that were performed at different times. In another example, sensor data 318 may include first sensor data collected by a first sensor of vehicle 302 during a first scan of a particular target, second sensor data collected by a second sensor of vehicle 302 during a second scan of the particular target, third sensor data collected by a third sensor of vehicle 304 during a third scan of the particular target, and so on.

Scanning target data 320 may include an indication of one or more targets (e.g., stationary objects, walls, buildings, features, etc.) in the environment in which vehicles 302, 304, 306 operate. For instance, target data 320 may include an indication of a predetermined location where a particular target is present in the environment. Further, in some instances, target data 320 may include an indication of one or more characteristics of the target (e.g., color, material, shape, etc.). System 310 may compile target data 320 in a variety of ways.

In a first example, target data 320 may include an indication of targets that are input by a user of system 310 (e.g., via an input interface (not shown) such as touch screen 254, microphone 256, a keyboard, a mouse, and/or any other input device or interface). For instance, an object can be placed in a particular location in the environment, and characteristics of the object (including its location) can be input to system 310 by the user.

In a second example, system 310 (e.g., based on execution of instructions 316 by processor(s) 312, etc.) can be configured to determine one or more targets in target data 320 based on sensor data 318. For instance, system 310 may search sensor data 318 for an indication of a target (e.g., object, feature, building, etc.) that was previously scanned by sensors of vehicles 302, 304, and/or 306 repeatedly and/or in multiple scans. In an example scenario, one or more of vehicles 302, 304, 306 may travel along or near a particular navigation path in the environment periodically, intermittently, or repeatedly over time. For instance, vehicles 302, 304, and/or 306 may return to a home location (e.g., parking area, etc.) every night after travelling in the environment during the day. Thus, in this scenario, sensor(s) in vehicles 302, 304, and/or 306 may scan a wall, building, or other feature of the environment near the home location one or more times every day (e.g., morning, evening, etc.). System 310 could thus identify the repeatedly scanned feature as a target for inclusion in target data 320.

In a third example, system 310 may be configured to cause vehicles 302, 304, 306 to scan a particular region of the environment for a potential sensor-testing target. For instance, consider a scenario where vehicle 302 collects first sensor data in a first region of the environment that indicates unexpected results (e.g., color quality of camera images degraded, LIDAR data inconsistent with RADAR data, etc.) compared to other sensor data collected by vehicle 302 in a second region of the environment. In this scenario, the disparity between the two regions may be due to environmental factors (e.g., noise signal sources, shading associated with high buildings, reflective objects, etc.) and/or could be due to a defect in the sensor. Thus, in this scenario, system 310 may be configured to instruct vehicles 304 and/or 306 (via interface 330) to travel to and scan the first region (or the second region). Next, system 310 may compare the scans by vehicles 302, 304, and/or 306 to identify a sensor-testing target that was scanned by more than one vehicle.

In some embodiments, system 310 may be configured to transmit an indication of target data 320 to vehicles 302, 304, 306 (via interface 330 and signals 340). In these embodiments, each vehicle may be configured to scan a particular target indicated by target data 320 when the vehicle travels near or within a threshold distance to that particular target. For example, if vehicle 302 determines (e.g., using GPS 226, IMU 228, etc.) that it is within the threshold distance to the particular target, then vehicle 302 may cause one or more of its sensors to scan the particular target. For instance, vehicle 302 could adjust the viewing direction of a LIDAR in the vehicle (e.g., LIDAR 122) toward a FOV that includes the particular target, or may select a portion of sensor data collected by another LIDAR in the vehicle (e.g., LIDAR 120) for data logging and storage. To that end, in some instances, the threshold distance may be based on a scanning range configuration of a sensor of the vehicle. For instance, if vehicle 302 includes a LIDAR (e.g., LIDAR 122) that is configured to scan for objects within a 300 meters range from the vehicle, then the threshold distance could be equal to or greater than 300 meters (e.g., 310 meters, etc.) to verify that the LIDAR is able to detect the particular target when it becomes within the 300 meter range (e.g., verify the maximum scanning range of the LIDAR).

Alternatively or additionally, in some embodiments, system 310 may be configured to instruct the vehicles 302, 304, 306 to scan the target (and/or store sensor data associated with a scan of the target) in response to the vehicles being within the threshold distance. For instance, a vehicle may transmit its location (e.g., measured using GPS 226, IMU 228, etc.) to system 310 as the vehicle travels through the environment. In turn, system 310 may detect that the vehicle is currently within the threshold distance based on the transmitted location data, and responsively instruct the vehicle to scan the target (and/or store sensor data associated with a scan of the target). Other examples are possible.

In some examples, one or more of the functions described above for the external computing system 310 can be performed by one or more of vehicles 302, 304, 306. In one example, the external computing system 310 can be integrated into a vehicle (e.g., incorporated in computer system 210 of vehicle 200). For instance, vehicle 302 may wirelessly communicate with vehicles 304 and 306 to receive sensor data 318, provide target data 320, and/or provide instructions for scanning a particular target. In another example, some of the functions described above for system 310 may be performed by one of the vehicles, and other functions can be performed by another vehicle. Other examples are possible.

III. EXAMPLE METHODS AND COMPUTER-READABLE MEDIA

Figure 4:
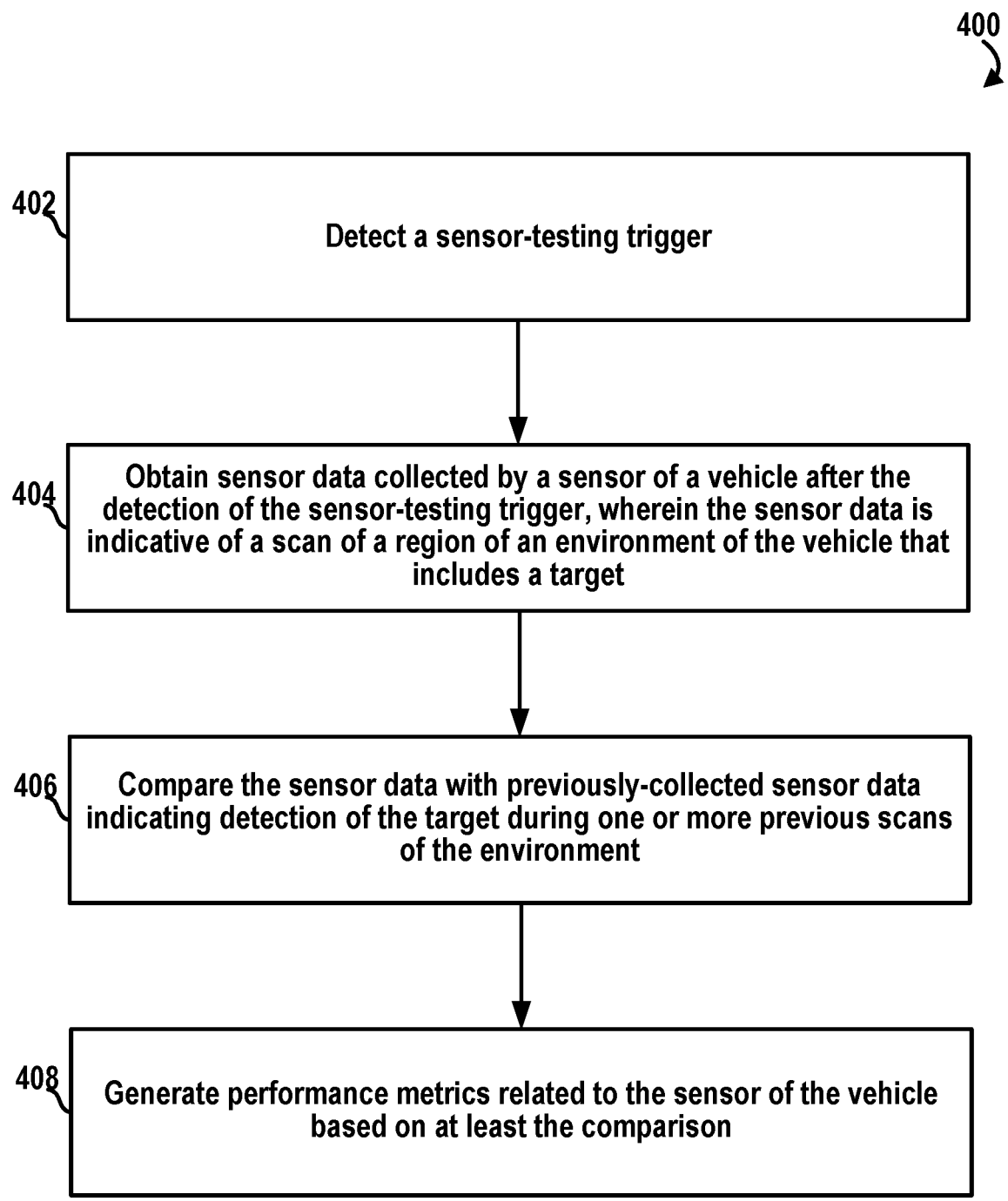
FIG. 4 is a flowchart of a method, according to an example embodiment.

FIG. 4 is a flowchart of a method 400, according to an example embodiment. Method 400 shown in FIG. 4 presents an embodiment of a method that could be used with any of the vehicles 100, 200, 302, 304, 306, and/or the systems 300, 310, for example. Method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally or alternatively, for the method 400 and other processes and methods disclosed herein, one or more blocks in the flowchart may represent circuitry that is wired to perform the specific logical functions in the process.

In some examples, for the method 400 and other processes and methods disclosed herein, the functions described in the flowchart may be performed by a single vehicle (e.g., vehicle 100, 200, etc.), distributed between multiple vehicles (e.g., vehicles 302, 304, 306), performed by a remote server/external computing system (e.g., system 310), and/or performed by a combination of one or more external computing systems and one or more vehicles, among other possibilities.

At block 402, method 400 involves detecting a sensor-testing trigger. In some examples, the sensor-testing trigger may be associated with one or more targets at predetermined location(s) in an environment.

In a first example, a vehicle (e.g., vehicle 200) may store (e.g., in data storage 214) an indication of predetermined scanning targets (e.g., similar to target data 320) that are at known or predetermined locations in an environment. For instance, a given target (e.g., building, wall, tree, stationary object) may have been previously detected using one or more sensors of the vehicle or other vehicles. Thus, a geographic location of the given target could be stored in the data storage (e.g., 214) of the vehicle. Alternatively, for instance, a list of calibration targets can be provided to the vehicle by a remote server (e.g., system 310), or input to the vehicle by a user (e.g., via touch screen 254, microphone 256, etc.). In some instances, one or more characteristics of the given target (e.g., color, texture, material, etc.) can also be stored together with the predetermined location in the data storage of the vehicle.

In a second example, a remote server may detect the sensor-testing trigger based on data it receives from a plurality of vehicles in the environment. Referring back to FIG. 3 for instance, system 310 may receive position data from vehicles 302, 304, 306, and may detect the sensor-testing trigger when one of the vehicles travels near one of the targets indicated in target data 320. To facilitate this, the position data can be collected by respective position and/or motion sensors (e.g., GPS 226, IMU 228, etc.) in the vehicles, and then communicated to the system 310 (e.g., via communication system 252, etc.).

Accordingly, in some embodiments, detecting the sensor-testing trigger at block 402 may involve determining (by a vehicle or by an external computing system) that a current position of a vehicle is within a threshold distance to a target in an environment of the vehicle. For instance, a vehicle (or remote server/external computing system) may track the current position of a vehicle (e.g., indicated by GPS 226, IMU 228, etc.), and then determine that the sensor-testing trigger is detected when the vehicle travels toward or near (e.g., within the threshold distance) to the predetermined location of the given target In some implementations, the threshold distance may be based on a scanning range or other scanning characteristic related to one or more sensors in the vehicle. Referring back to FIG. 2 for example, the threshold distance can be computed according to a scanning range of LIDAR 232 (e.g., distance from the vehicle at which the LIDAR is expected to detect or identify objects successfully), RADAR 230, camera 234, etc. In some examples, multiple threshold distances can be used to detect the sensor-testing trigger at block 402 depending on the various scanning range configurations of the various sensors in the vehicle.

In some embodiments, method 400 may involve determining a condition of the environment, and detecting the sensor-testing trigger may be based on the determined condition. For example, a SONAR sensor of the vehicle may have a maximum scanning range that varies based on temperature, wind speed, and/or humidity, among other environmental factors. Thus, in some examples, a system of method 400 can be configured to accumulate sensor performance metrics for various environmental conditions. Through this process, the reliability and performance of the various vehicle-mounted sensors can be improved in different environmental conditions.

In some examples, the threshold distance (at which a sensor-testing trigger is detected) may be based at least in part on the condition of the environment. In a first example, the threshold distance may be determined (by the vehicle or the external system) based on a temperature of the environment (e.g., indicated by a temperature sensor of the vehicle, a sensor of another vehicle, a sensor of an external system, etc.). In a second example, the threshold distance can be determined according to other environmental conditions (e.g., fog, rain, humidity, etc.) that affect measurements by one or more scanning sensors of the vehicle. In a third example, the vehicle (or system) of method 400 may receive information indicating environmental conditions (e.g., sunlight, clouds, rain, etc.) from another computing device (e.g., weather server, etc.).

In some embodiments, a vehicle of method 400 may include a given sensor (e.g., temperature sensor 225) that provides a measurement of a condition of the environment of the vehicle. In these embodiments, detecting the sensor-testing trigger at block 402 may involve determining that the measurement of the condition of the environment is within a threshold range. For example, if the given sensor detects that the vehicle is operating in an environmental condition (e.g., in which was not sufficiently tested during previous scans of the target), such as in a high temperature, humidity, or foggy environment for instance, then the vehicle (or system) of method 400 may determine that the sensor-testing trigger is detected. By doing so, for instance, a system (or vehicle) of method 400 can accumulate sensor data for testing the performance of the sensor in various types of environmental conditions (which may be otherwise difficult or costly to simulate for a large number of sensors or vehicles).

In some embodiments, detecting the sensor-testing trigger at block 402 may involve determining that the sensor is not occluded from viewing the target by one or more objects between the vehicle and the target. For instance, if the vehicle is within the threshold distance to the target but the view of the target by the sensor is blocked (e.g., occluded) due to another vehicle being present between the sensor and the target, then the trigger may not be detected because the sensor might not be able to view the target even though it is within the maximum scanning range of the sensor. Various examples are possible for determining that the sensor is not occluded.

In a first example, the vehicle may use a second sensor (e.g., LIDAR) to scan the environment and determine if there are one or more objects that would occlude the sensor being tested (e.g., RADAR) from viewing the target. In a second example, sensor data collected by the sensor (when the vehicle is within the threshold distance) can be analyzed at a later time (e.g., by the vehicle or by an external computing system) to identify portions of the sensor data collected during times when the sensor was occluded. Further, for instance, the identified portions can be removed from the sensor-data associated with the sensor-testing trigger (and/or not relied upon as a basis for the determination of sensor performance metrics). Other examples are possible.

Other conditions are possible as well for the detection of the sensor-testing trigger at block 402. Thus, in some examples, detecting the sensor-testing trigger at block 402 may involve determining whether the sensor is expected to be capable of scanning the target at a time of the sensor-testing trigger. For instance, a system (or vehicle) of method 400 may determine that the sensor is incapable of scanning the target if the view of the target by the sensor is occluded by one or more objects between the sensor and the target, by interference from external signal sources, and/or by one or more objects near the target (e.g., which may affect the cross-section of the target detectable by a RADAR, etc.), among other possibilities.

At block 404, method 400 involves obtaining sensor data collected by a sensor of a vehicle after the detection of the sensor-testing trigger at block 402. The sensor data may relate to a scan of a region of an environment of the vehicle that includes a target (e.g., predetermined or previously scanned target, etc.).

In some embodiments, obtaining the sensor data at block 404 may involve causing the sensor of the vehicle to scan the region of the environment that includes the target in response to detecting the sensor-testing trigger. Referring back to FIG. 1D for example, the vehicle 100 may receive instructions (e.g., from a computer system of vehicle 100 or from an external computing system) that cause the vehicle to adjust the viewing direction of LIDAR 122 (shown in FIG. 1B) such that contour 164 is pointing toward the target. To facilitate this, a predetermined location of the target can be retrieved by the vehicle 100 from data storage in the vehicle (e.g., data storage 214 of vehicle 200), and/or can be transmitted to vehicle 100 (e.g., via wireless signals 340 of system 300) by a remote server (e.g., system 310) that stores predetermined locations of targets in the environment (e.g., target data 320).

In other embodiments, obtaining the sensor data at block 404 may involve receiving input sensor data associated with one or more scans of the environment by the sensor, selecting (from the input sensor data) the sensor data indicative of the scan performed by the sensor at block 404, and storing the selected sensor data.

By way of example, LIDAR 120 (shown in FIG. 1B) may be configured to continuously rotate through complete rotations (360 degrees) to scan the field of view between contours 160 and 162. In this example, vehicle 100 (or an external system in communication with the vehicle) can select a portion of the data collected by LIDAR 120 to be stored or logged in data storage (e.g., data storage 214 of the vehicle, or data storage 314 of an external system) and another portion of the data to be removed from the data storage. For instance, the portion of the sensor data that corresponds to the scan of the region of the environment where the target is located can be identified and saved in the data storage. By doing so, the sensor data (e.g., sensor data 318) can be efficiently indexed or organized to indicate which portions of the sensor data are associated with scans of the target. In some instances, other portions of the sensor data associated with scans of other regions of the environment by LIDAR 120 can optionally be removed or pruned from the stored data. Thus, for instance, the amount of data storage available can be efficiently utilized by discarding historical sensor data that is unrelated to scans of the calibration target(s).

Thus, in some examples, storing the selected sensor data may involve storing the selected sensor data in data storage of the vehicle (e.g., data storage 214). In other examples, storing the selected sensor data may involve transmitting the selected sensor data to an external computing system (e.g., system 310) for remote storage (e.g., in sensor data 318 of data storage 314). Other examples are possible as well.

In some embodiments, method 400 may involve determining whether the sensor of block 404 is assigned to scan a second region of the environment while the vehicle is within the threshold distance to the target. Referring back to FIG. 1D for example, the LIDAR (e.g., LIDAR 122) associated with contour 164 may be assigned to scan a different region of the environment of vehicle 100 (e.g., by navigation system 248, etc.) than the region where the target is located. In this example, the vehicle (or system) of method 400 may decide to postpone or prevent scanning the (first) region of the environment where the target is located to allow the sensor (e.g., LIDAR 122) to continue scanning the second region. By doing so, the vehicle may allow the sensor to be used for higher priority tasks (e.g., autonomous navigation of the vehicle).

Accordingly, in some embodiments, obtaining the sensor data at block 404 may be based on a determination that the sensor is not currently assigned to scan the second region of the environment.

Additionally or alternatively, in some embodiments, obtaining the sensor data at block 404 may be based on a determination that the sensor completed the scan of the second region while the vehicle is within the threshold distance to the target. Continuing with the example above, if the sensor (e.g., LIDAR 122) completes scanning the second region while vehicle 100 is still within the threshold distance to the target, then vehicle 100 may begin scanning the first region (which includes the target).

Additionally or alternatively, in some embodiments, method 400 may involve determining a first priority of scanning the first region using the sensor, and a second priority of scanning the second region using the sensor. In these embodiments, obtaining the sensor data (at block 404) associated with the first region may be further in response to a determination that the first priority is higher than the second priority. For example, in a scenario where the second region can be scanned by another sensor of the vehicle, the vehicle may determine a second priority (for scanning the second region by the sensor) that is lower than a first priority (for scanning the first region by the sensor). By doing so, the vehicle may allow the sensor to scan the target while also allowing normal vehicle scanning operations to be completed using a different sensor of the vehicle.

In some embodiments, method 400 may also involve determining a first time associated with a previous scan of the first region by the sensor. In these embodiments, determining the first priority (of scanning the first region using the sensor) may be based on a difference between the first time and a second time associated with the detection of the sensor-testing trigger. For instance, if the sensor of the vehicle has not scanned the target for a threshold amount of time, then a higher priority can be assigned for scanning the first region to enable calibrating the sensor and/or verifying that the sensor is still operating properly after the previous scan of the target was performed.

At block 406, method 400 involves comparing the sensor data (obtained at block 404) with previously-collected sensor data that indicates detection of the target during one or more previous scans of the environment.

In one example, the previously-collected sensor data may be similar to sensor data 318 of system 300. In another example, the previously-collected sensor data may include sensor data collected by the sensor of block 404 and/or one or more other sensors of the vehicle during previous scans of the target. In yet another example, the previously-collected sensor data may include sensor data collected by one or more sensors of a plurality of vehicles that previously scanned the target.

The previously-collected sensor data can be stored and/or retrieved by the system (or vehicle) performing the method 400 in various ways. In a first example, the previously-collected sensor data can be stored in data storage (e.g., data storage 214) of the vehicle. In a second example, the vehicle may obtain the previously-collected sensor data from external data storage via a wireless communication system of the vehicle (e.g., system 252). For instance, the previously-collected sensor data can be transmitted to the vehicle by a computer system of another vehicle. Alternatively, for instance, the previously-collected sensor data can be transmitted to the vehicle by a remote server (e.g., external system 310, etc.).

In some embodiments, the previously-collected sensor data may include comparative sensor data indicative of at least one previous scan by the same sensor of block 404. In these embodiments, method 400 may also involve determining a first measurement of a scanning characteristic indicated by the sensor based on the sensor data (obtained at block 404), and determining a second measurement of the scanning characteristic based on the comparative sensor data. In these embodiments, the comparison at block 406 may involve comparing the first measurement with the second measurement.

In a first example, the scanning characteristic may relate to a scanning range of the sensor. For instance, the first measurement may indicate a first maximum distance (or range) from the vehicle at which the sensor was able to detect the target, and the second measurement may indicate a second maximum distance. As noted above, the first and second measurements may be obtained at different times by the same sensor. Thus, in some instances, a system (or vehicle) of method 400 may detect a change in the maximum scanning range of the sensor (e.g., due to a defect, etc.) by comparing the first and second measurements.

In a second example, the scanning characteristic may relate to a measured characteristic of objects in the environment. For example, where the sensor is a camera, the scanning characteristic may be a color content measured by the camera. Thus, for example, if the first measurement indicates a color of the target (e.g., bright red) that is different from a color of the target (e.g., dark red) indicated by the second measurement, then the vehicle (or system) of method 400 may detect such change at block 404. In turn, for instance, the vehicle (or system) may adjust calibration parameters for modifying image pixel data received from the camera or modifying exposure times or other operation parameters of the camera to account for the change in the scanning characteristic (e.g., color data) of the camera sensor.

In some embodiments, method 400 may involve generating navigation instructions for the vehicle, causing the vehicle to move toward a destination location in the environment based on at least scans of the environment by the sensor and the generated navigation instructions, and modifying the navigation instructions to cause the vehicle to stop in response to a difference between the first measurement and the second measurement (of the scanning characteristic)

being greater than the threshold. Referring back to FIG. 2 for example, navigation system 248 can be used to generate the navigation instructions, and propulsion system 202 may cause vehicle 200 to travel to the destination location accordingly. In this example, navigation system 248 may decide to stop the vehicle (prior to arriving at the destination location) in response to detection of a threshold difference between the first and second measurements. For instance, vehicle 200 may exit from an autonomous operation mode and stop the vehicle if LIDAR 232 if the sensor is deemed unreliable for safely navigating the vehicle autonomously to the destination location.

In some embodiments, method 400 may involve transmitting an identification of the sensor and an indication of a defect in the scanning characteristic of the sensor for receipt by an external computing system. For example, in a scenario where a change in the scanning range, error tolerance, or other scanning characteristic of the sensor is identified, the vehicle may transmit (e.g., via communication system 252) a request to a remote server (e.g., system 310) for scheduling maintenance or calibration of the sensor.

In these embodiments, method 400 may also optionally involve transmitting the identification of the sensor based on at least a difference between the first measurement and the second measurement (of the scanning characteristic) being greater than a threshold. Continuing with the example above, the vehicle may transmit a request for calibration to the remote server only in situations where the measured change in the scanning characteristic of the sensor (e.g., scanning range, alignment offset, color offset, etc.) exceeds a threshold. Thus, the vehicle (or system) of method 400 can allow for minor variations in the scanning characteristic without triggering a calibration request.

Alternatively or additionally, in some embodiments, method 400 may involve selecting the sensor of block 404 ("first sensor") to perform a subsequent scan of the environment based on the difference between the first measurement and the second measurement being less than a threshold, and selecting a second sensor of the vehicle to perform the subsequent scan based on the difference being greater than the threshold. For instance, if a calibration error or misalignment determined for the first sensor (e.g., RADAR) exceeds a tolerance threshold, then the reliability of the first sensor may be deemed unacceptable. In response, the vehicle or system of method 400 could use the second sensor (e.g., LIDAR) for future scans instead of the first sensor. On the other hand, if the error or misalignment is deemed minor or insignificant, then the vehicle (or system) of method 400 may continue using the first sensor for performing the subsequent scan of the environment.

As noted above, the first and second measurements of the scanning characteristic (e.g., scanning range, color characteristic, etc.) may be obtained using the same sensor during different scans performed at different times. Thus, in some scenarios, a defect in the sensor can be detected by comparing the first and second measurements. However, in other scenarios, the difference between the first and second measurements may be caused by other factors such as a degradation or change in the condition of the target and/or environmental factors (e.g., background noise, rain, fog, etc.) that affect measurements by the sensor.

Accordingly, in some embodiments, method 400 may involve determining a third measurement of the scanning characteristic using other-vehicle sensor data collected by a second sensor of another vehicle, and detecting a change in a characteristic of the target or a characteristic of the environment based on a difference between the first measurement and the third measurement being also greater than the threshold. Referring back to FIG. 1D for example, if the second measurement indicates that the scanning range associated with contour 164 is different from the scanning range indicated by the first measurement by a threshold amount, and a similar LIDAR of another vehicle also detects a similar change in the scanning range when it scans the same target, then vehicle 100 may determine that the change is due to a change in the target itself (e.g., the target was moved or damaged) or due to a change in a condition of the environment that affects LIDAR measurements (e.g., heavy rain, fog, etc.), rather than due to a problem with the LIDAR of vehicle 100.

At block 408, method 400 involves generating performance metrics related to the sensor of the vehicle based on at least the comparison. In some examples, the performance metrics may include data indicative of a performance of the sensor.

In a first embodiment, generating the performance metrics at block 408 may involve identifying a range of distances within which the sensor conforms to a particular scanning configuration. Referring back to FIG. 1D for example, the generated performance metrics for a RADAR sensor associated with contours 182a and 182b may indicate the range of distances at which the RADAR can reliably detect objects having a particular size (e.g., one meter cross-section, etc.). As another example, the generated performance metrics may indicate a distance (e.g., maximum scanning range, etc.) between vehicle 100 and contour 162 that is suitable for object detection or identification using sensor data from LIDAR 120. For instance, the distance to contour 162 may be the distance at which LIDAR 120 was able to detect or identify the target.

In a second embodiment, generating the performance metrics at block 408 may involve generating performance metrics for the sensor that is specific to one or more environmental conditions (e.g., time of day, temperature, humidity, wind speed, visibility/fog presence, background noise levels, etc.). For instance, such performance metrics may account for an error rate, resolution, signal quality, and/or any other scanning characteristics of the sensor (e.g., RADAR, LIDAR, SONAR, camera, etc.) affected by the environmental conditions.

Referring back to FIG. 1D for example, the scan of the target (at block 404) may indicate that the target can be detected by the sensor (e.g., LIDAR 130) when the target is at a first maximum range (e.g., 8 meters) to vehicle 100. In this example, the previously-collected sensor data (of block 406) may indicate that the target was detected by the sensor according to the first maximum range during previous scans performed at a similar time of day (e.g., morning, etc.). In this example however, the previously-collected sensor data may also indicate that the target was detected at a different (second) maximum range from the vehicle (e.g., 10 meters) during previous scans performed by the sensor at different times of day (e.g., afternoons, etc.). In turn, for instance, a vehicle (or system) of method 400 may generate performance metrics for the sensor that associates the time of day with a scanning characteristic (e.g., scanning range, etc.) of the sensor. Additionally or alternatively, for instance, the vehicle (or system) of method 400 may determine one or more environmental conditions occurring during the time of day (e.g., morning) that affect the maximum scanning range of the sensor.

Thus, in some examples, the performance metrics of block 408 can be used to identify environmental conditions that affect the performance of the sensor or similar sensors.

Further, in some examples, the system (or vehicle) operating the sensor can be configured to use the performance metrics to generate environment-specific calibration data that is applied temporarily when such environmental conditions are detected again in the future. For instance, if a light detection sensitivity of a camera sensor during a particular time of day (e.g., mornings) is determined to be different than it is at other times of day, a calibration parameter of the camera (e.g., exposure time period, shutter speed, etc.) can be adjusted during that particular time of day to account for the changed light detection sensitivity. Other examples are possible.

In a third embodiment, generating the performance metrics at block 408 may involve identifying the sensor of the vehicle for calibration. By way of example, the previously-collected sensor data (of block 406) may include comparative sensor data collected by a LIDAR (e.g., the sensor) during previous scans (e.g., on other days, etc.). In this example, the comparative sensor data may indicate that the target was detected by the LIDAR at a particular distance (e.g., 100 meters) to the vehicle during the previous scans. In this example however, the sensor data collected at block 404 may indicate that the target was not detected until it was at a different distance (e.g., 80 meters) from the vehicle. Thus, in this example, the vehicle (or system) of method 400 may detect a potential defect in the maximum scanning range capability of the sensor, and may thus store (or transmit) performance metrics identifying the sensor (e.g., to a calibration server, maintenance server, or user of the vehicle, etc.) as a candidate for repair, calibration, alignment, and/or maintenance, etc.

In a fourth embodiment, generating the performance metrics at block 408 may involve determining one or more alignment offsets between the sensor of the vehicle and another sensor of the vehicle.

By way of example, the sensor data obtained at block 404 may indicate that the target, as observed by a first sensor (e.g., LIDAR 122) of the vehicle, is at a first distance from the vehicle (e.g., 60 meters). Further, the previously-collected sensor data (of block 406) may include second sensor data collected using a second sensor of the vehicle (e.g., LIDAR 120) while the vehicle is at the same position at which the first sensor (e.g., LIDAR 122) scanned the target. In this example however, the second sensor data from the second sensor may indicate that the target is at a different second distance (e.g., 59 meters) to the vehicle. Thus, in this example, the vehicle (or system) of method 400 may determine an alignment offset between the first sensor and the second sensor. For instance, the disparity between the measured distances may be due to a difference between reference positions (e.g., where distance to target corresponds to zero meters) assigned to the two sensors with respect to the vehicle, or other alignment offset between corresponding 3D maps (or spaces) determined for the sensor data collected by the two sensors.

As another example, consider a scenario where the vehicle is at a particular position in the environment when it obtains a first scan of the target using a first sensor of the vehicle and a second scan of the target using a second sensor of the vehicle. Further, in this scenario, first sensor data collected by the first sensor (e.g., LIDAR) may indicate that the target is at a first position (e.g., 150 meters north of the vehicle), and second sensor data collected by the second sensor (e.g., camera) may indicate that the target is at a second position (e.g., 1 meter to the left of the first position). Thus, in this example, the vehicle (or system) of method 400 may determine an alignment offset that aligns the scan of the first sensor (e.g., location of target relative to vehicle) with the corresponding scan of the second sensor (e.g., image pixel locations of the target in images captured by the camera).

Accordingly, in some implementations, method 400 may involve obtaining second sensor data collected using a second sensor of the vehicle while the sensor of block 404 ("first sensor") is collecting the sensor data ("first sensor data") described at block 404. In these embodiments, method 400 may also involve comparing the first sensor data with the second sensor data, and determining an alignment offset between the first sensor and the second sensor based on the comparison. In some instances, comparing the first sensor data with the second sensor data may involve comparing a first location of the target indicated by the first sensor data (e.g., target location indicated by a LIDAR) with a second location of the target indicated by the second sensor data (e.g., target location indicated by a camera). Additionally, in these instances, determining the alignment offset may involve determining a difference between the first location and the second location, in line with the discussion above.

In a fifth embodiment, generating the performance metrics at block 408 may involve associating measurements by the sensor with locations of one or more objects in the environment. By way of example, the vehicle may perform a first scan of the target using the sensor (e.g., LIDAR, etc.) indicating that the target is at a first distance to the vehicle (e.g., 60 meters). The vehicle (or system) may then determine that the vehicle moved to a different position in the environment after performing the first scan (e.g., 10 meters closer to the target) based on data from one or more sensors or control systems of the vehicle (e.g., IMU 228, GPS 226, propulsion system 202, steering unit 238, navigation system 248, etc.). The vehicle may then perform a second scan of the target (e.g., after moving 10 meters toward the target) using the same sensor used for the first scan. The second scan may indicate that the target is at a second distance to the vehicle. In this example however, the second distance measured during the second scan may be different (e.g., 49 meters) than an expected distance (e.g., 60-10=50 meters). Thus, in this example, the vehicle (or system) of method 400 may determine a misalignment (e.g., absolute range of the sensor) between sensor data from the sensor and a frame of reference of the vehicle with respect to the environment (e.g., as measured by an IMU or GPS of the vehicle, etc.). Thus, the vehicle (or system) of method 400 may adjust a mapping between measurements obtained by the sensor and the geographic locations or distances of objects in the environment.

In a sixth embodiment, generating the performance metrics at block 408 may involve associating sensor data collected by the sensor with a measurement of a characteristic of scanned objects in the environment. By way of example, where the sensor is a camera, the sensor data may include a representation of a color characteristic of the scanned objects. For instance, the camera may generate images (i.e., sensor data) that include pixel data (e.g., an amount of red, green, and/or blue light represented at image pixel location, etc.). In some scenarios, color measurements by the camera may vary between individual images captured by the camera at different times. This variation may be due to calibration errors or drifts, a change of the color of the object, environmental factors (e.g., background light, etc.), among other possibilities. Thus, in this example, the vehicle (or system) of method 400 may compare a color characteristic of the target indicated in the sensor data (of block 404), with the corresponding color characteristic of the target indicated in the previously-collected sensor data (of block 406). By doing so, for instance, the vehicle or system of method 400 can detect instances where the color calibration of the camera changes (e.g., due to a defect, etc.) over time. Further, in some instances, the vehicle (or system) can then adjust calibration data (e.g., calibration coefficients, etc.) used to map subsequent color measurements by the camera to actual colors of objects scanned by the camera.

In some embodiments, method 400 may involve operating the sensor of the vehicle to perform subsequent scans of the environment based on at least the performance metrics generated at block 408. As noted above for example, calibration information used to interpret sensor data from the sensor can be updated to better align measurements by the sensor with measurements by other sensors of the vehicle. Additionally or alternatively, the vehicle (or system) of method 400 may select a different sensor of the vehicle to perform the subsequent scans of the environment if the performance metrics indicates that that the sensor is defective.

In some embodiments, method 400 may involve calibrating the sensor of the vehicle based on the performance metrics generated at block 408. For example, the mounting position or orientation of the sensor (e.g., LIDAR, RADAR, camera, SONAR, etc.) in the vehicle can be adjusted. As another example, the focus setting and/or image capture settings (e.g., exposure time, etc.) of a camera can be calibrated using the measured performance metrics. Thus, in various examples, the calibration of the sensor based on the performance metrics may involve extrinsic and/or intrinsic calibration.

In some embodiments, method 400 may involve validating performance of the sensor based on the performance metrics generated at block 408. For example, the maximum scanning range of a LIDAR sensor can be validated against an expected scanning range (e.g., to ensure that the LIDAR hardware did not degrade over time, etc.). As another example, the blurriness or other optical performance characteristic (e.g. Modulation Transfer Function (MTF) test, etc.) of a camera sensor can be validated against an expected blurriness or optical performance characteristic (e.g., to ensure that camera or lens has not been damaged and/or degraded over time, etc.).

In line with the discussion above, one example implementation may involve a system (or vehicle) of method 400 obtaining the sensor data (at block 404) associated with a current scan of the target after the sensor-testing trigger is detected (at block 402). The system (or vehicle) can then compare (at block 406) the current scan of the target with previous scans (e.g., by the same sensor, by another sensor of the vehicle, or by another sensor of another vehicle). For example, the system (or vehicle) can compare various characteristics of the target indicated by the current scan (e.g., color, shape, appearance, perceived location in the environment, range at which the target is first detected, material characteristics, etc.) with previous measurements of these same characteristics that are indicated in the one or more previous scans. In this example implementation, if the measured characteristics differ between the current scan and the previous scans by at least a threshold amount, then the system (at block 408) may identify the sensor of the vehicle for calibration or further testing, prevent the vehicle from using the sensor for subsequent scans of the environment, update the calibration information (e.g., calibration coefficients) used to interpret sensor data from the sensor, associate sensor measurements from the sensor with various environmental conditions (e.g., light conditions, weather conditions, temperature, background noise level, time of day, etc.), validate the reliability of the sensor (e.g., validate that the sensor hardware has not degraded, etc.), verify or test expected sensor capabilities (e.g., test the maximum scanning range of a LIDAR, test the MTF of a camera lens, etc.), and/or align the sensor with other sensors in the vehicle, among other possibilities. Further, in some instances, the sensor validation/verification/calibration process described above can be repeated at various times when the vehicle travels near the target (or another target) to ensure continued adherence of the sensor with particular specifications and/or particular error tolerances.

Figure 5:
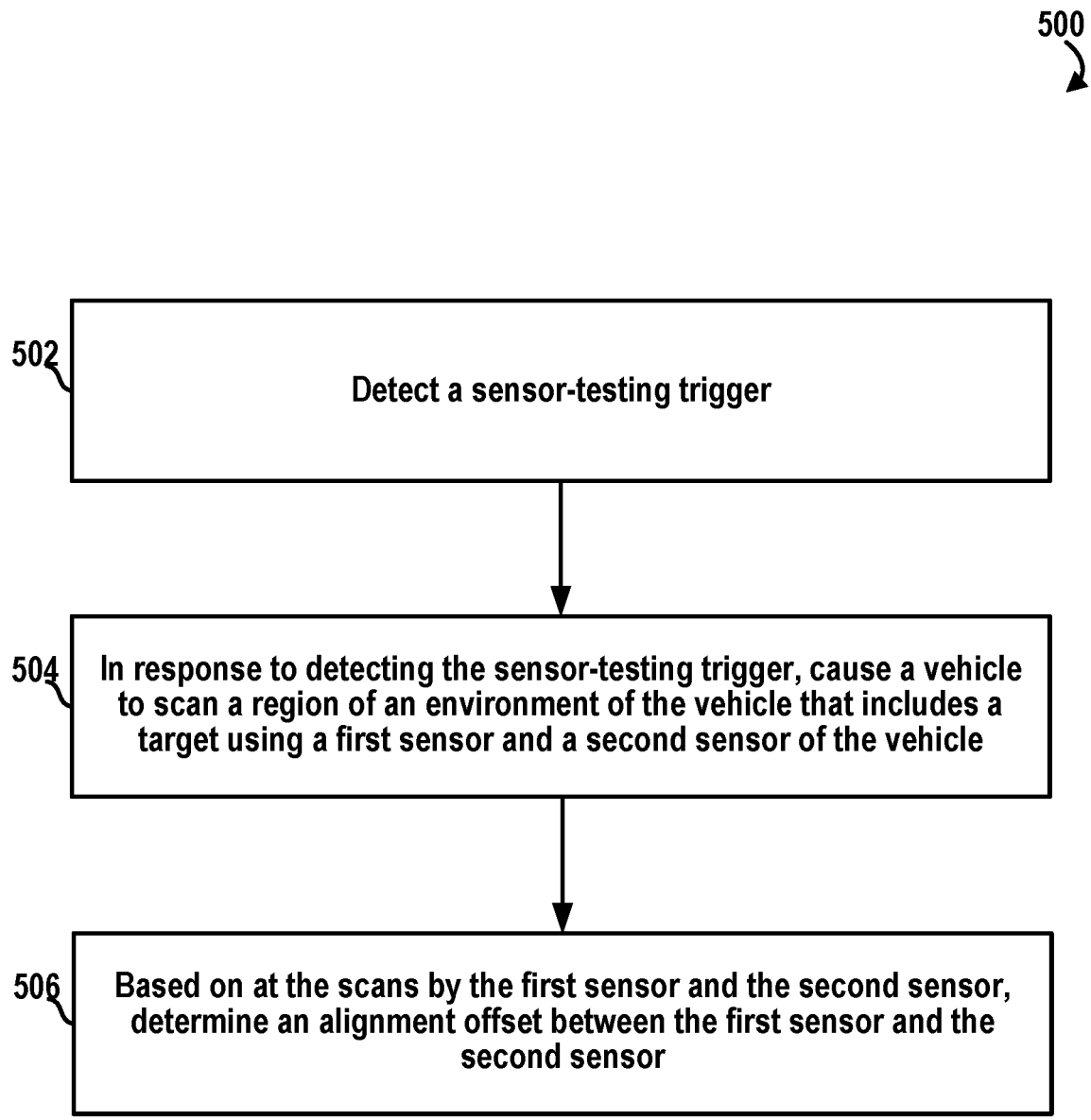
FIG. 5 is a flowchart of another method, according to an example embodiment.

FIG. 5 is a flowchart of a method 500, according to an example embodiment. Method 500 shown in FIG. 5 presents an embodiment of a method that could be used with any of the vehicles 100, 200, 302, 304, 306, and/or the systems 300, 310, for example. Method 500 may include one or more operations, functions, or actions as illustrated by one or more of blocks 502-506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, method 500 involves detecting a sensor-testing trigger. For example, the detection at block 502 may be similar to the detection described at block 402 of method 400. For example, detecting the sensor-testing trigger may involve determining that the vehicle is within a threshold distance to a target in the environment of the vehicle. The target may be associated with previously-collected sensor indicative of one or more previous scans of the environment by one or more sensors of one or more vehicles.

At block 504, method 500 involves causing a vehicle to scan a region of an environment of the vehicle that includes the target using a first sensor and a second sensor of the vehicle in response to detecting the sensor-testing trigger at block 502. For instance, the vehicle can be configured to scan the region of the environment that includes the target using the first sensor (e.g., first LIDAR) and a second sensor (e.g., second LIDAR) simultaneously. Alternatively, for instance, the vehicle may scan the region using the first and second sensors while the vehicle is at a same location in the environment (e.g., both scans can be performed while the target is at a same distance to the vehicle, etc.).

At block 506, method 500 involves determining an alignment offset between the first sensor and the second sensor based on the scans of the target by the first sensor and the second sensor. For example, if the scan by the first sensor indicates that the target is at a first distance to the vehicle (e.g., 60 meters) and the scan by the second sensor indicates that the target is at a different second distance to the vehicle (e.g., 59 meters), then the vehicle (or system) of method 500 may determine an alignment offset between measurements collected by the first sensor and measurements collected by the second sensor to align subsequent scans by the two sensors with one another. For instance, a calibration offset of one meter can be introduced to the measured distances of either sensor so that an object detected by the first sensor appears to be at the same location in the environment in which it is represented in the scan by the second sensor.

In some embodiments, method 500 may involve adjusting a mounting position of the first sensor (or the second sensor) in the vehicle based on the determined alignment offset. For example, the first sensor can be moved from its current mounting position (e.g., rotated, moved in a linear direction, etc.) to align its view of the environment with the view indicated by the second sensor. Alternatively, for example, the second sensor can be moved similarly to align its view of the environment with the view indicated by the first sensor.

Figure 6:
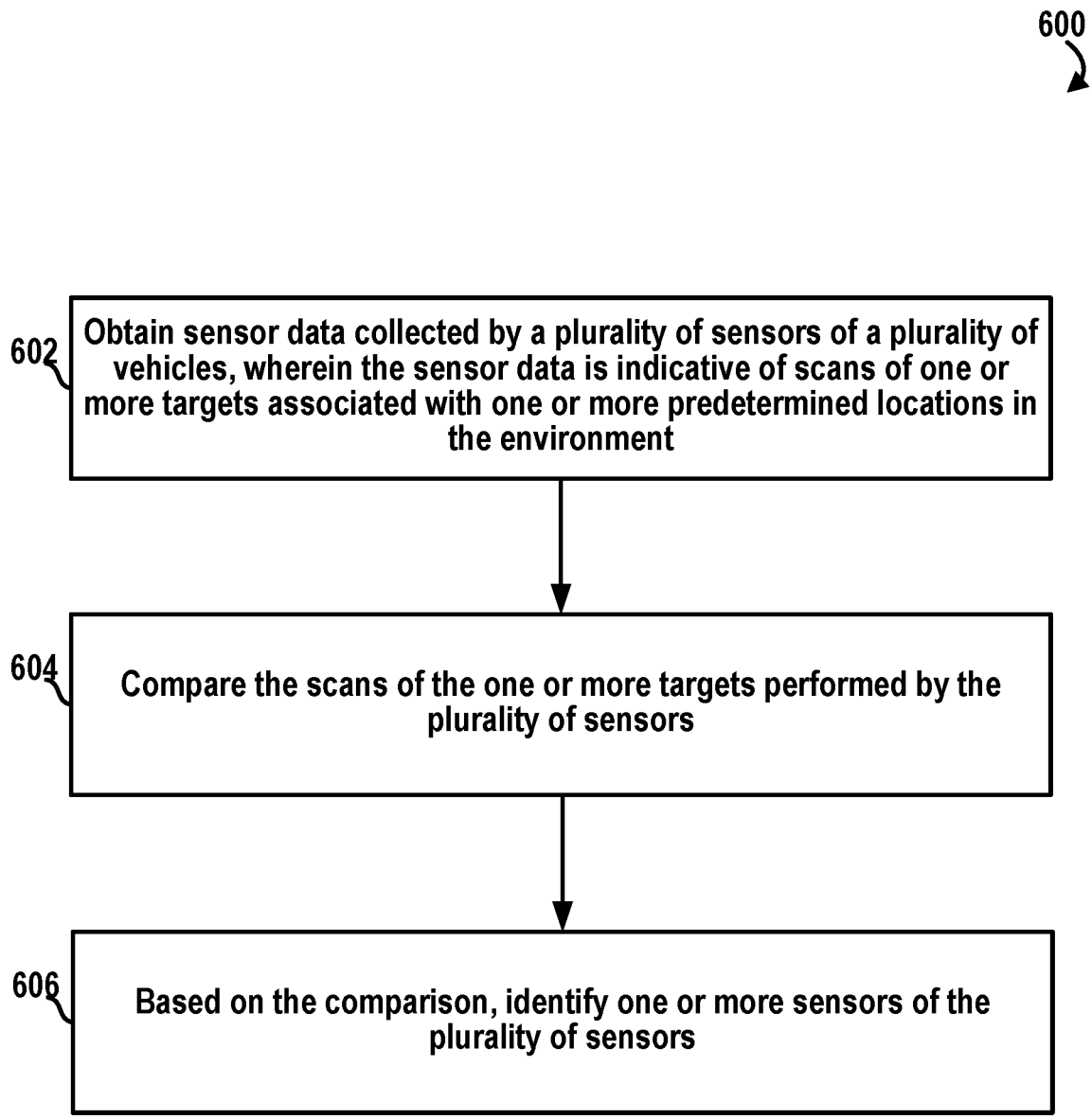
FIG. 6 is a flowchart of yet another method, according to an example embodiment.

FIG. 6 is a flowchart of a method 600, according to an example embodiment. Method 600 shown in FIG. 6 presents an embodiment of a method that could be used with any of the vehicles 100, 200, 302, 304, 306, and/or the systems 300, 310, for example. Method 600 may include one or more operations, functions, or actions as illustrated by one or more of blocks 602-606. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, method 600 involves obtaining sensor data collected by a plurality of sensors of a plurality of vehicles (e.g., vehicles 302, 304, 306, etc.). The sensor data and the plurality of vehicles may be similar, respectively, to sensor data 318 and vehicles 302, 304, 306. Further, the process for obtaining the sensor data at block 602 may be similar to the process described at block 402 of method 400 and/or in the description of sensor data 318 of system 310. Referring back to FIG. 3 for example, system 310 may wirelessly communicate (via interface 330) with vehicles 302, 304, 306 to obtain sensor data 318 collected using a plurality of sensors mounted in vehicles 302, 304, 306 during scans of one or more targets by the sensors.

At block 604, method 600 involves comparing the scans of the one or more targets (obtained at block 602). For example, the vehicle (or system) of method 600 may compare scanning characteristics indicated by the respective sensors during the scans of the one or more targets (e.g., maximum scanning range of the corresponding sensor, measured position of a target in the environment, measurement of color or other characteristic of the target, etc.).

At block 606, method 600 involves identifying one or more sensors of the plurality of sensors based on the comparison. For example, a given sensor that exhibits unexpected or different scanning characteristics in a given scan of the target as compared to one or more other scans of the target (e.g., by the same sensor at a different time, or by one or more other sensors at the same time or at different times) can be identified for further testing or calibration to determine whether the given sensor is defective.

IV. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements that are described are functional entities that may be implemented as discrete or distributed components or in conjunction with other components, in any suitable combination and location, or other structural elements described as independent structures may be combined. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    detecting, by a vehicle, a sensor-testing trigger, wherein detecting the sensor-testing trigger comprises determining that the vehicle is within a threshold distance to a target in a first region of an environment of the vehicle;
    determining a condition of the environment, wherein detecting the sensor-testing trigger is based on the determined condition corresponding to one of a plurality of different environmental conditions;
    determining a first priority of scanning the first region using a sensor of the vehicle, and a second priority of scanning a second region of the environment using the sensor;
    based on at least the first priority being higher than the second priority, obtaining sensor data collected by the sensor after the detection of the sensor-testing trigger, wherein the sensor data is indicative of a scan of the first region of the environment that includes the target;
    comparing the sensor data with previously-collected sensor data indicating detection of the target by one or more sensors during one or more previous scans of the environment;
    based on at least the comparison, generating, for each of the plurality of different environmental conditions, performance metrics related to the sensor of the vehicle and a respective environmental condition of the plurality of different environmental conditions; and
    causing, based on at least scans of the environment by the sensor and navigation instructions, the vehicle to move toward a destination location in the environment.

2. The method of claim 1, wherein detecting the sensor-testing trigger further comprises determining that the sensor is not occluded from viewing the target by one or more objects between the vehicle and the target.

3. The method of claim 1, further comprising:
    based on at least the generated performance metrics, operating the sensor of the vehicle to perform subsequent scans of the environment.

4. The method of claim 1, wherein obtaining the sensor data comprises:
    in response to detecting the sensor-testing trigger, causing the sensor of the vehicle to scan the region of the environment that includes the target.

5. The method of claim 1, wherein obtaining the sensor data comprises:
    receiving, from the sensor, input sensor data associated with one or more scans of the environment by the sensor;
    selecting, from the input sensor data, the sensor data indicative of the scan of the region of the environment that includes the target; and
    storing, in data storage of the vehicle, the selected sensor data.

6. The method of claim 1, wherein the previously-collected sensor data includes comparative sensor data indicative of at least one previous scan by the sensor, the method further comprising:
    determining a first measurement of a scanning characteristic associated with the sensor based on the sensor data; and determining a second measurement of the scanning characteristic based on the comparative sensor data, wherein comparing the sensor data with the previously-collected sensor data comprises comparing the first measurement with the second measurement.

7. The method of claim 6, wherein the scanning characteristic relates to a scanning range of the sensor.

8. The method of claim 6, further comprising:
based on at least a difference between the first measurement and the second measurement being greater than a threshold, transmitting, for receipt by an external computing system, an identification of the sensor and an indication of a defect in the scanning characteristic of the sensor.

9. The method of claim 6, further comprising:
in response to at least a difference between the first measurement and the second measurement being greater than a threshold, modifying the navigation instructions to cause the vehicle to stop.

10. The method of claim 6, wherein the sensor is a first sensor, and wherein the vehicle includes a second sensor that scans the environment, the method further comprising:
based on at least a difference between the first measurement and the second measurement being less than a threshold, selecting the first sensor to perform a subsequent scan of the environment; and
based on at least the difference being greater than the threshold, selecting the second sensor to perform the subsequent scan of the environment.

11. The method of claim 6, wherein the sensor is a first sensor, wherein the previously-collected sensor data includes other-vehicle sensor data indicative of at least one previous scan by another sensor of another vehicle, the method further comprising:
based on at least a difference between the first measurement and the second measurement being greater than a threshold, determining a third measurement of the scanning characteristic based on the other-vehicle sensor data; and
based on at least the difference between the first measurement and the third measurement being also greater than the threshold, detecting a change in a characteristic of the target or a characteristic of the environment of the vehicle.

12. The method of claim 1, further comprising:
determining whether the sensor is assigned to scan the second region of the environment while the vehicle is within the threshold distance to the target, wherein obtaining the sensor data associated with the first region is further based on a determination that the sensor is not assigned to scan the second region while the vehicle is within the threshold distance to the target.

13. The method of claim 1, further comprising:
determining that the sensor is currently scanning the second region of the environment after the detection of the sensor-testing trigger, wherein obtaining the sensor data associated with the first region is further based on a determination that the sensor completed the scan of the second region while the vehicle is still within the threshold distance to the target.

14. The method of claim 1, further comprising:
determining that the sensor is assigned to scan a second region of the environment while the vehicle is within the threshold distance to the target, wherein determining the first priority and the second priority is in response to the determination that the sensor is assigned to scan the second region of the environment while the vehicle is within the threshold distance to the target.

15. The method of claim 14, further comprising:
determining a first time associated with a previous scan of the first region by the sensor, wherein determining the first priority is based on a difference between the first time and a second time associated with the detection of the sensor-testing trigger.

16. The method of claim 1, wherein the sensor is a first sensor, wherein the sensor data is first sensor data, the method further comprising:
obtaining second sensor data collected using a second sensor of the vehicle while the first sensor is collecting the first sensor data, wherein the second sensor data is indicative of a scan of the region of the environment that includes the target;
comparing the first sensor data with the second sensor data; and
based on the comparison of the first sensor data with the second sensor data, determining an alignment offset between the first sensor and the second sensor, wherein generating the performance metrics comprises determining the alignment offset.

17. The method of claim 16, wherein comparing the first sensor data with the second sensor data comprises comparing a first location of the target indicated by the first sensor data to a second location of the target indicated by the second sensor data, and wherein determining the alignment offset comprises determining a difference between the first location and the second location.

18. The method of claim 1, wherein the target includes a building, a wall, a tree, a landmark, a stationary object, a reflective object, or a geographic feature at a predetermined location in the environment.

19. The method of claim 1, wherein the plurality of different environmental conditions relate to one or more of temperature, humidity, wind speed, light, weather, background noise, or time of day.

20. The method of claim 1, wherein generating the performance metrics comprises:
associating a scanning characteristic of the sensor with one or more of the plurality of different environmental conditions.

* * * * *